United States Patent
Agarwal et al.

(10) Patent No.: US 12,547,438 B2
(45) Date of Patent: Feb. 10, 2026

(54) SINGLE HOP APPROACH FOR DISTRIBUTED BLOCK STORAGE VIA A NETWORK VIRTUALIZATION DEVICE

(71) Applicant: Oracle International Corporation, Redwood Shores, CA (US)

(72) Inventors: Deepak Agarwal, Redmond, WA (US); Travis John Portz, Seattle, WA (US); Qiang Wang, Bellevue, WA (US); Haining Mo, Kenmore, WA (US); Kent Lee, Ladera Ranch, CA (US)

(73) Assignee: Oracle International Corporation, Redwood Shores, CA (US)

( * ) Notice: Subject to any disclaimer, the term of this patent is extended or adjusted under 35 U.S.C. 154(b) by 840 days.

(21) Appl. No.: 17/747,277

(22) Filed: May 18, 2022

(65) Prior Publication Data

US 2023/0376333 A1 Nov. 23, 2023

(51) Int. Cl.
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/0665* (2013.01); *G06F 3/0683* (2013.01); *G06F 3/0689* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 5,889,965 | A | 3/1999 | Wallach et al. |
| 6,324,608 | B1 | 11/2001 | Papa et al. |
| 6,671,256 | B1 | 12/2003 | Xiong et al. |
| 7,818,606 | B1 | 10/2010 | Stack et al. |
| 8,606,910 | B2 | 12/2013 | Alperovitch et al. |
| 9,923,798 | B1 | 3/2018 | Bahadur et al. |

(Continued)

FOREIGN PATENT DOCUMENTS

WO 2022057439 A1 3/2022

OTHER PUBLICATIONS

"nvm Express", retrieved from https://nvmexpress.org, Jun. 10, 2019 and printed on Sep. 30, 2022, 5 pages.

(Continued)

*Primary Examiner* — Qing Yuan Wu
(74) *Attorney, Agent, or Firm* — Kilpatrick Townsend & Stockton LLP

(57) ABSTRACT

A network virtualization device receives a storage request from a compute instance executed by a host machine separate from the network virtualization device, the storage request comprising data to be stored. Responsive to receiving the storage request, the network virtualization device divides the data to be stored into a set of one or more data stripes. For a first data stripe in the set of data stripes, the network virtualization device determines, from a plurality of extent servers, a first extent server to which the first data stripe is to be sent for storing the first data stripe, transmits the first data stripe to the first extent server, wherein the first extent server stores the first data stipe to a first physical storage device, and receives, from the first extent server, an acknowledgement confirming that the first data stripe was stored.

20 Claims, 17 Drawing Sheets

(56) References Cited

U.S. PATENT DOCUMENTS

| | | |
|---|---|---|
| 9,998,394 B2 | 6/2018 | Agrawal et al. |
| 10,652,115 B1 | 5/2020 | Chen et al. |
| 11,226,773 B1 | 1/2022 | Patel et al. |
| 11,327,812 B1 | 5/2022 | Shveidel et al. |
| 11,757,757 B2 | 9/2023 | Alaettinoglu et al. |
| 11,924,086 B2 | 3/2024 | Wang et al. |
| 12,346,565 B2 | 7/2025 | Wang et al. |
| 2003/0182411 A1 | 9/2003 | Wang et al. |
| 2006/0095468 A1 | 5/2006 | Allen et al. |
| 2010/0122111 A1 | 5/2010 | Allen et al. |
| 2010/0131669 A1 | 5/2010 | Srinivas et al. |
| 2013/0003559 A1 | 1/2013 | Matthews |
| 2013/0166727 A1 | 6/2013 | Wright et al. |
| 2014/0126356 A1 | 5/2014 | Lee et al. |
| 2015/0188796 A1 | 7/2015 | Bugenhagen |
| 2015/0215211 A1 | 7/2015 | Bhikkaji et al. |
| 2015/0281288 A1 | 10/2015 | Levinson et al. |
| 2015/0319237 A1 | 11/2015 | Hussain et al. |
| 2016/0313985 A1 | 10/2016 | Sprygada et al. |
| 2017/0034843 A1 | 2/2017 | Liu et al. |
| 2017/0324813 A1 | 11/2017 | Jain et al. |
| 2018/0287912 A1 | 10/2018 | Zabarsky et al. |
| 2018/0295042 A1 | 10/2018 | Koster et al. |
| 2018/0375760 A1 | 12/2018 | Saavedra |
| 2019/0073141 A1* | 3/2019 | Brennan ............. G06F 11/1076 |
| 2019/0073162 A1* | 3/2019 | Karr ........................ G06F 3/067 |
| 2019/0073265 A1* | 3/2019 | Brennan ................ G06F 3/061 |
| 2019/0190851 A1 | 6/2019 | Hsu et al. |
| 2020/0264954 A1* | 8/2020 | Belgaied ............... G06F 3/0619 |
| 2020/0278892 A1 | 9/2020 | Nainar et al. |
| 2021/0111998 A1 | 4/2021 | Saavedra |
| 2021/0409262 A1 | 12/2021 | Watson et al. |
| 2022/0229787 A1 | 7/2022 | Veluswamy et al. |
| 2022/0232073 A1 | 7/2022 | Kuttuva Jeyaram et al. |
| 2022/0329520 A1 | 10/2022 | Degrace et al. |
| 2023/0281049 A1 | 9/2023 | Dong et al. |

OTHER PUBLICATIONS

'SPDK', retrieved from https://spdk.io/, on Sep. 30, 2022, 5 pages.

U.S. Appl. No. 18/198,638, Non-Final Office Action, mailed on Feb. 14, 2025, 27 pages.

U.S. Appl. No. 18/318,457, "Non-Final Office Action", mailed Sep. 10, 2024, 18 pages.

U.S. Appl. No. 18/318,525, "Notice of Allowance", Oct. 10, 2023, 10 pages.

U.S. Appl. No. 18/520,207, Non- Final Office Action mailed on Apr. 17, 2025, 23 pages.

U.S. Appl. No. 18/649,290, "Non-Final Office Action", mailed Jul. 2, 2025, 13 pages.

U.S. Appl. No. 18/318,457, "Notice of Allowance", mailed Mar. 26, 2025, 9 pages.

U.S. Appl. No. 18/520,207, "Non-Final Office Action", mailed Apr. 10, 2025, 10 pages.

U.S. Appl. No. 18/198,638, "Final Office Action", mailed Oct. 27, 2025, 30 pages.

U.S. Appl. No. 18/520,207, "Notice of Allowance", mailed Aug. 20, 2025, 5 pages.

U.S. Appl. No. 18/649,290, "Final Office Action", mailed on Dec. 15, 2025, 14 pages.

* cited by examiner

1200

1210
Generating, by application executing on a compute instance on the host machine, a request to store data

1220
Receiving, by kernel of the host machine from the application executing on the compute instance on the host machine, data to be stored

1230
Transmitting, by the kernel of the host machine, using a storage driver and through a root port, a request including the data to an NVD, wherein a storage handler subsystem of the NVD performs disk striping on the data and transmits one or more data stripes to one or more extent servers for storage on physical storage devices

1240
Receiving, by the kernel of the host machine, using the storage driver and through the root port, an acknowledgment from the storage handler subsystem of the NVD that the data was successfully stored on the physical storage devices by the one or more extent servers.

*FIG. 12*

SINGLE HOP APPROACH FOR DISTRIBUTED BLOCK STORAGE VIA A NETWORK VIRTUALIZATION DEVICE

TECHNICAL FIELD

This disclosure generally relates to storage of data. More specifically, but not by way of limitation, this disclosure relates to using a network virtualization device for distributed storage of data on multiple extent servers.

BACKGROUND

Cloud service provider systems maintain cloud infrastructure (e.g. hardware) that supports virtual network services (e.g. databases, email services, applications, etc. that execute on compute instances) of clients, including host computing machines (e.g. host servers), network virtualization devices (NVDs, e.g. network interface cards), and storage servers/devices (e.g. extent storage servers). In some instances, cloud service provider systems provide storage hardware which are accessible to client services. When a client service initiates a storage write request, a conventional cloud service provider system may route the request to a target server, which stripes the data and stores data stripes on multiple extent storage servers. However, using this conventional system requires two separate network communication steps (hops): a first communication step from the network virtualization device to the target server, and a second communication step from the target server to the extent servers. Accordingly, use of the conventional system that includes the target server may result in requests (e.g. writing data, reading data, deleting data, etc.) being bottlenecked at the target server. Therefore, using this conventional system can result in long wait times for client services to store, modify, or otherwise access data.

SUMMARY

The present disclosure generally relates to storage of data. More specifically, but not by way of limitation, this disclosure relates to using a network virtualization device for distributed storage of data on multiple extent servers. Various inventive embodiments are described herein, including methods, systems, non-transitory computer-readable storage media storing programs, code, or instructions executable by one or more processors, and the like.

Techniques are described for providing distributed storage, by an NVD, of data on physical storage devices accessible to one or more extent servers. An NVD is described that is configured to receive storage write requests from a compute instance of a host machine, perform data striping on data included in the storage write requests, and perform storage operations by communicating with multiple extent servers to store data stripes. The NVD is configured to receive confirmation from each of the multiple extent servers that a respective data stripe associated with a storage write request has been stored on a physical storage device accessible to the respective extent server and provide, to the compute instance, confirmation that the data included in the storage write request was successfully stored.

In certain embodiments, responsive to receiving a storage request at an NVD, wherein the storage request originates from a compute instance executed by a host machine separate from the NVD and wherein the storage request comprises data to be stored, the NVD: divides the data to be stored into a set of one or more data stripes. The NVD, for a first data stripe in the set of data stripes: determines, from a plurality of extent servers, a first extent server to which the first data stripe is to be sent for storing the first data stripe; transmits the first data stripe to the first extent server, wherein the first extent server stores the first data stripe to a first physical storage device; and receives, from the first extent server, an acknowledgement confirming that the first data stripe was stored.

In certain embodiments, in response to receiving an acknowledgement, for each of the one or more data stripes confirming that the data stripe was stored by a respective extent server, the NVD transmits, to the compute instance, a confirmation that the data was successfully stored.

In certain embodiments, the first extent server stores the first data stripe in a physical storage device accessible to the first extent server and the first extent server sends the first acknowledgement in response to storing the first data stripe on the physical storage device.

In certain embodiments, a group of servers comprises the first extent server and one or more other extent servers. The first extent server transmits the first data stripe to the one or more other servers of the group of servers for storage by the one or more other servers.

In certain embodiments, for a second data stripe in the set of data stripes, the NVD: determines, from the plurality of extent servers, a second extent server to which the second data stripe is to be sent for storing the second data stripe, wherein the second extent server is different from the first extent server; transmits the second data stripe to the second extent server, wherein the second extent server stores the second data stripe to a second storage device, wherein the second storage device is different from the first storage device; and receives, from the second extent server, an acknowledgement confirming that the second data stripe was stored.

In certain embodiments, identifying the one or more extent servers further comprises identifying, by the NVD and among the one or more identified extent servers, a primary candidate leader server and a secondary candidate leader server. The secondary candidate leader server comprises the first extent server. The primary candidate leader server comprises a third extent server. The NVD, at a time prior to transmitting the first data stripe to the first extent server: transmits, to the third extent server, the first data stripe; and receives, from the third extent server, a notification that the third extent server is not a leader. The first data stripe is transmitted to the first extent server in response to receiving the notification.

In certain embodiments, generating the one or more data stripes comprises applying a redundant array of independent disks striping algorithm ("RAID0 algorithm") to divide the data to be stored into the set of data stripes.

In certain embodiments, the storage write request is a non-volatile memory express ("NVMe") protocol request.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 12 depicts a method for transmitting, by a host machine, a data request to an NVD and receiving, by the host machine from the NVD, an acknowledgment of successful storage of the data on physical storage devices accessible to extent servers that communicate with the NVD, in accordance with certain embodiments.

DETAILED DESCRIPTION

Example NVME Architecture

Figure 1:
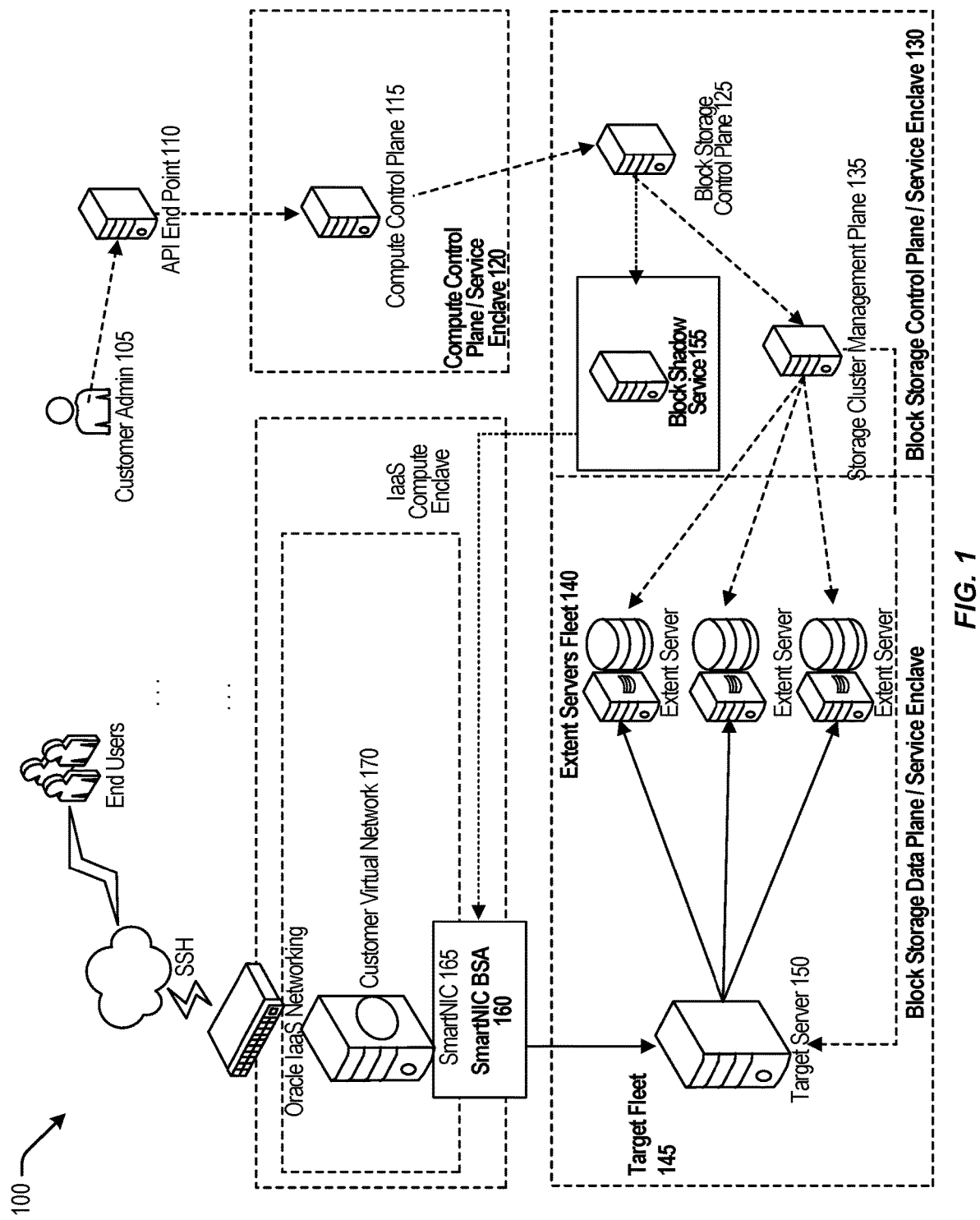
FIG. 1 is a simplified control path diagram showing cloud infrastructure components for attaching persistent storage, according to an embodiment, for example, using NVMe.

Creating and running a cloud service can include mounting and connecting persistent storage to cloud instances. The persistent storage can be created, using a console or application programming interface (API), and linked to cloud instances (e.g., a virtual machine (VM) host or a bare metal (BM) host running in the cloud). Linking, or attaching, persistent storage to a cloud instance can be performed using a communication protocol. The attached storage can communicate with the cloud instance's guest operating system (OS) using the protocol.

Connections between a cloud instance and persistent storage are flexible and a number of configurations are possible. For instance, the persistent storage can be attached to one or more cloud instances simultaneously. The data in the persistent storage is durable and the storage can retain data after an attachment to a cloud instance is removed. Data can be migrated between instances by detaching persistent storage from one cloud instance and attaching the storage to a second instance.

Durable persistent storage can allow for instance scaling. A cloud instance can be deleted without destroying or reformatting the instance's persistent storage. After the cloud instance is deleted, the instances' persistent storage can be attached to a new instance. The new instance can be created with a different instance type or shape. For example, the new cloud instance can be a VM or a BM regardless of the deleted instance's type. Additionally, the number of cores in a cloud instance can be changed by deleting an initial instance and creating a new instance with a different number of cores.

A transfer of data through an attachment can be started with an endpoint called an initiator. Data can be sent from the initiator to an endpoint that can receive data called a target. An agent can set up the target to receive data and forward the data to the target. A number of advantages can be provided by locating the initiator in a smart network interface card (smartNIC). A user may need to provide login information or other configuration from the cloud instance if the initiator is located in the instance. Additionally, it can be difficult to keep the initiator functional across different guest OS types and OS versions. Locating the initiator in the smartNIC can also free customer resources that would be used to run the initiator.

Attachments can be provided using storage networking standards including Internet Small Computer Systems Interface (iSCSI), paravirtualized (PV) iSCSI, and Non-Volatile Memory Express (NVMe). iSCSI can provide attachments for bare metal (BM) devices with the initiator running from inside a customer instance. The initiator for PV iSCSI attachments can be set up and run inside a cloud instance's hypervisor, and PV iSCSI attachments can be limited to running on virtual machines (VM). The initiator for NVMe attachments can be run on a smartNIC. Accordingly, NVMe attachments can provide attachments for both VM and BM networks.

FIG. 1 is a simplified control path diagram 100 showing cloud infrastructure components for attaching persistent storage, according to an embodiment, for example, using NVMe. A customer administrator 105 can submit a request for a new storage attachment at an application programming interface (API) endpoint 110. In some examples, the customer administrator 105 may be any entity that manages or otherwise administers the use of cloud instances for a customer of the cloud service. In some instances, the API endpoint 110 may be an interface where customer's (e.g., customer administrator 105) can access the cloud service resources, for example, by making requests to have operations performed by the cloud service on resources managed for the customer. The request can be forwarded to the compute control plane 115 in a compute control plane service enclave 120. In some instances, compute control plane 115 can be a series of APIs that can provision, manage, reconfigure, or terminate resources based on user requests. The request can be forwarded from compute control plane 115 to the block storage control plane 125 in the block storage control plane enclave 130. In some examples, the block storage control plane 125 can be a series of APIs that can provision, manage, reconfigure, or terminate block storage.

A request that is received at block storage control plane 125 can be forwarded to the storage cluster management plane 135. Storage cluster management plane 135 can manage the server fleets, and, for example, storage cluster management plane 135 can manage extent server fleet 140 and target server fleet 145. In some examples, storage cluster management plane 135 can configure and monitor extent server fleet 140 or target server fleet 145, and extent server fleet 140 can include servers storing striped and encrypted customer data. Volumes can be striped across multiple extent servers in extent server fleet 140. Extent servers can be a block storage data plane service that handles extent-level I/O and stores the data for replication. In response to the request, storage cluster management plane 135 can identify at least one target server 150 in the target server fleet 145 as a target server for the attachment. In some instances, target server 150 can be a server that manages the flow of customer data to and from extent server fleet 140. Target server 150 can accept I/O requests from a NVMe initiator and send the requests to extent server fleet 140. The storage cluster management plane 135 can select the target server 150 based at least in part on the load experienced by the servers in the target server fleet 145, or the expected volume for the attachment. Storage cluster management plane 135 can forward information about the new attachment to the selected target server 150 or the extent server fleet 140. The information can identify one or more target servers that are able to receive traffic from the new attachment.

The request can be forwarded from block storage control plane 125 to the block shadow service 155. The block shadow service 155 can act as an agent, and block shadow service 155 can communicate with the block smartNIC agent (BSA) 160 in smartNIC 165. In some examples, smartNIC 165 can be hardware that can connect the customer virtual network 170 to other computer networks. BSA 160 can serve as a communication link between block shadow service 155 and an NVMe agent in smartNIC 165. Communication from the block shadow service 155 can provide information about the target server and the attachment to BSA 160. A connection between the customer virtual network 170 and target server fleet 145 can be established by BSA 160. BSA 160 can expose a namespace to the host through host PCIe connection, which can be accessed by the host applications and by the customer through the customer virtual network 170. The customer virtual network 170 can be set up by the VCN, and traffic from customer virtual network 170 can reach extent servers fleet 140 via target server fleet 145 through smartNIC 165.

Figure 2:
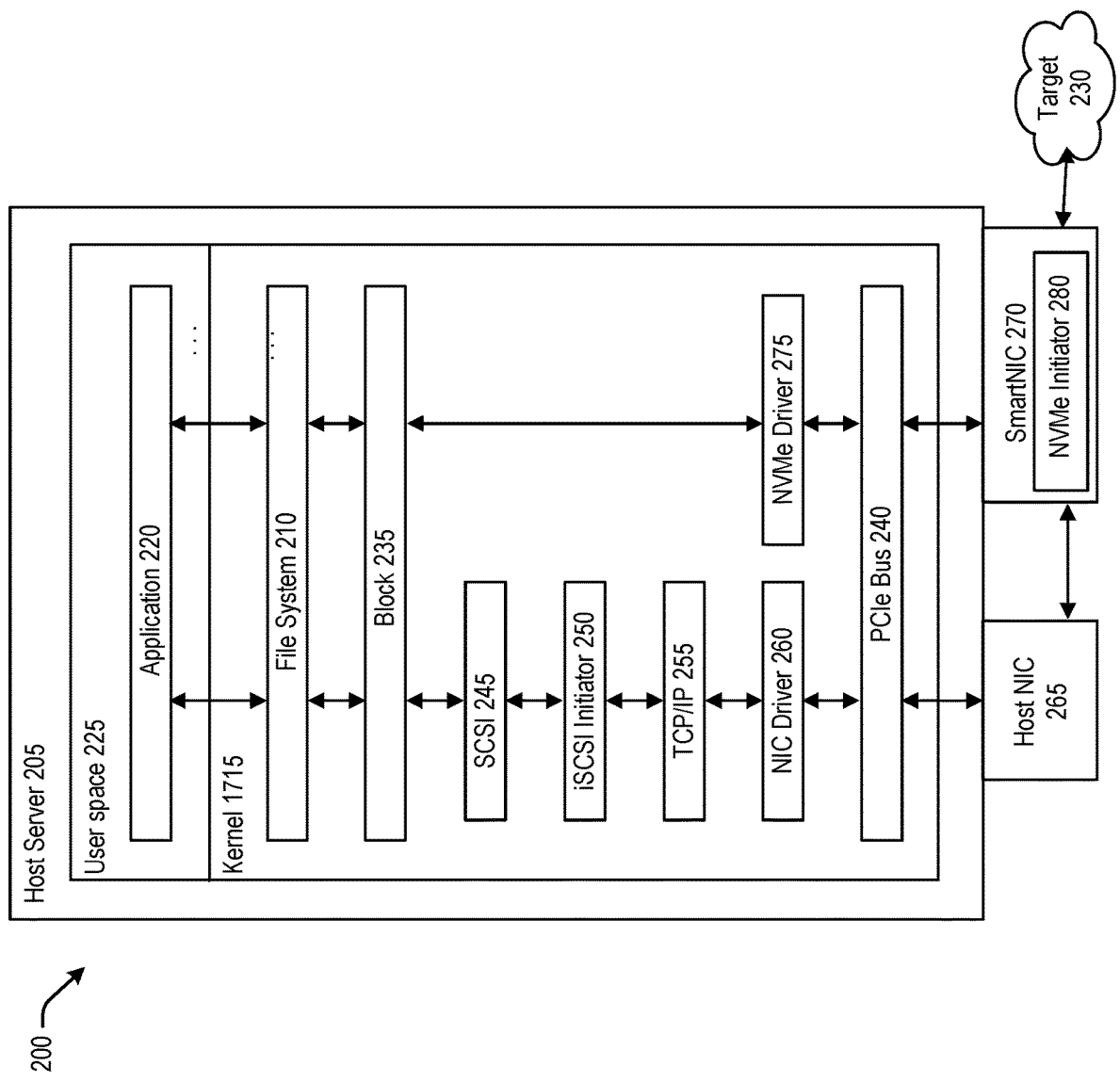
FIG. 2 is a diagram showing a kernel architecture for implementing Internet Small Computer Systems Interface (iSCSI) and Non-Volatile Memory Express (NVMe) attachments.

FIG. 2 is a diagram 200 showing a kernel architecture for implementing Internet Small Computer Systems Interface (iSCSI) and Non-Volatile Memory Express (NVMe) attachments, according to an embodiment. NVMe and iSCSI are networking protocols providing block-level storage access, and both NVMe and iSCSI can be used to attach persistent storage. One difference between the two standards is that, in an iSCSI architecture, input/output (IO) requests reach a smartNIC via a host network interface card (NIC), and, in an NVMe architecture, the smartNIC is directly connected to a Peripheral Component Interconnect Express (PCIe) bus. The NVMe kernel stack can be streamlined compared to the iSCSI stack, and NVMe's simplified architecture can be achieved because the NVMe initiator can be located in the smartNIC.

In a host server 205 (e.g., host machine 110), using either networking protocol, traffic can reach a file system 210 (e.g. file system 110) in the kernel 215 (e.g., kernel 110) from an application 220 (e.g. application 113) in the user space 225. The traffic can be addressed to a target 230 that can be a block storage server (e.g., target fleet 145, extent servers fleet 140, etc.). Traffic for the two standards can follow similar pathways until the traffic arrives at block 235 from file system 210.

Using iSCSI, traffic from block 235 reaches the PCIe bus 240 (e.g., root port 140) via SCSI 245, iSCSI initiator 250, TCP/IP 255, and the NIC driver 260. iSCSI traffic leaving PCIe bus 240 can reach the target via host NIC 265 and smartNIC 270. In some instances, PCIe bus 240 can be a serial computer expansion bus. The NVMe pathway can follow a different pathway, and NVMe traffic can reach PCIe bus 240 from block 235 via NVMe driver 275 (e.g. storage driver 118). Instead of passing through host NIC 265, NVMe traffic can travel from PCIe 240 to smartNIC 270 before reaching target 230. The NVMe initiator 280 (e.g. initiator 135) can be located in smartNIC 270 instead of being located in kernel 215 like iSCSI initiator 250.

Figure 3:
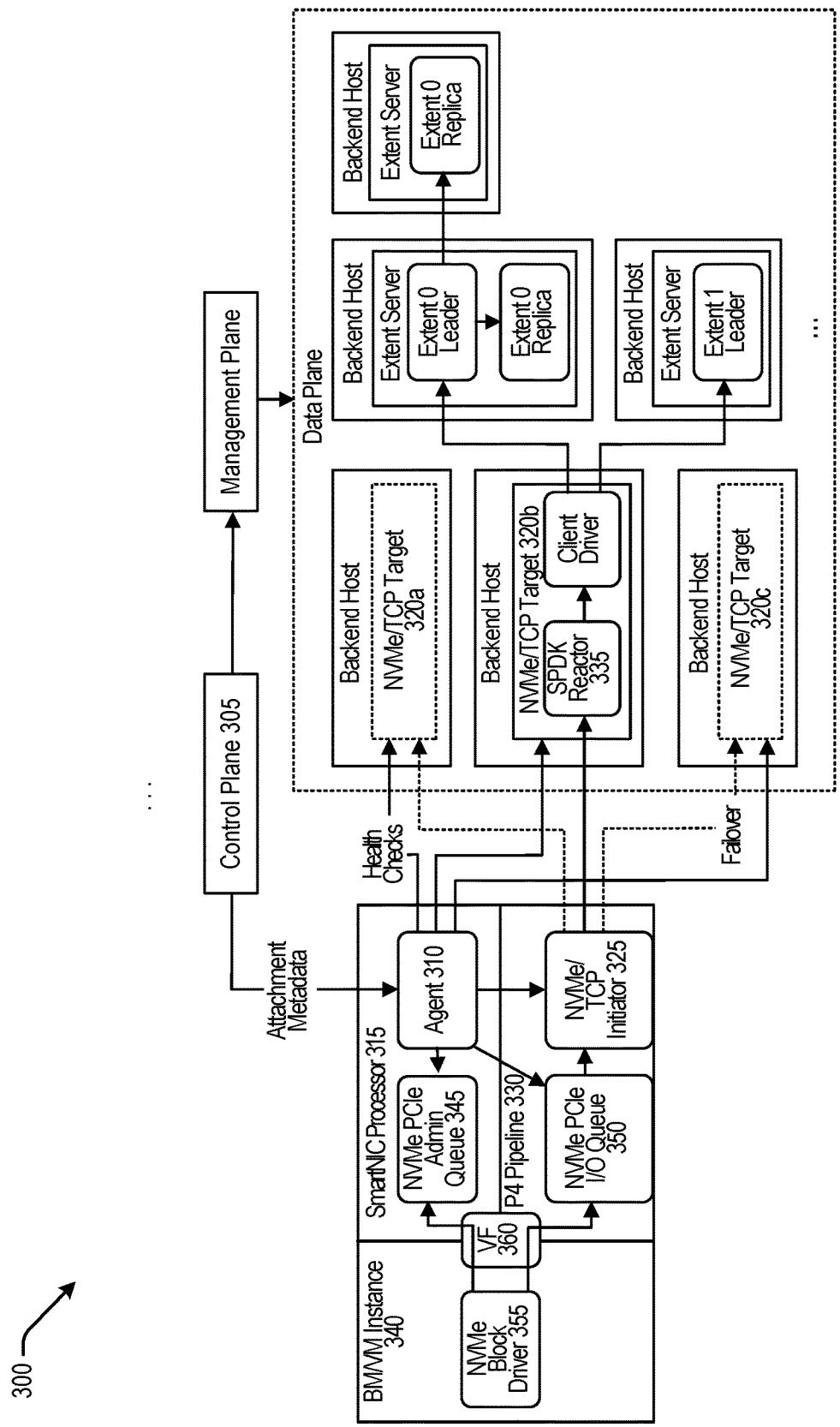
FIG. 3 is a Non-Volatile Memory Express (NVMe) system diagram.

FIG. 3 is a Non-Volatile Memory Express (NVMe) system diagram 300 according to an embodiment. A customer, such as customer admin 105, can initiate an NVMe attachment request from the console or a public API (e.g., API end point 110). The NVMe attachment request can be forwarded from the control plane 305 (e.g. block storage control plane 125) to an agent 310 (e.g., smartNIC BSA 160) in the smartNIC processor 315. The agent 310 can perform health checks on NVMe/TCP targets 320a-c to identify healthy targets, and agent 310 can instruct the NVMe/TCP initiator 325 in the Programming Protocol-Independent Packet Processors (P4) pipeline 330 to establish a connection with a healthy NVMe/TCP target (e.g., NVMe/TCP target 320b). P4 is a domain-specific programming language that is optimized for controlling packet forwarding. NVMe/TCP initiator 325 can communicate with Storage Performance Development Kit (SPDK) reactor 335 to initiate the connection.

Once a connection is established with NVMe/TCP target 320b and the NVMe attachment is completed, virtual machine/bare metal (VM/BM) instance 340 can issue NVMe admin commands or NVMe I/O commands to the NVMe/TCP target 320b. The NVMe commands can be issued from BM/VM instance 340 to NVMe PCIe admin queue 345 or NVMe PCIe I/O queue 350 via NVMe block driver 355 and virtual function (VF) 360. In some examples, VF 360 can be a PCIe function that supports single root I/O visualization (SR-IOV). In some instances, the admin queue can be used to establish host-controller associations and the queue can support commands like Identify, Get/Set Features, etc. Agent 310 can retrieve NVMe admin commands from the NVMe PCIe admin queue 345 and forward those commands to NVMe/TCP target 320b, or the commands can be processed locally. I/O commands received from VM/BM instance 340 can be enqueued into NVMe PCIe I/O queue 350. NVMe block driver 355 can retrieve the enqueued commands from NVMe PCIe I/O queue 350 to NVMe/TCP target 320b via NVMe/TCP initiator 325.

Figure 4:
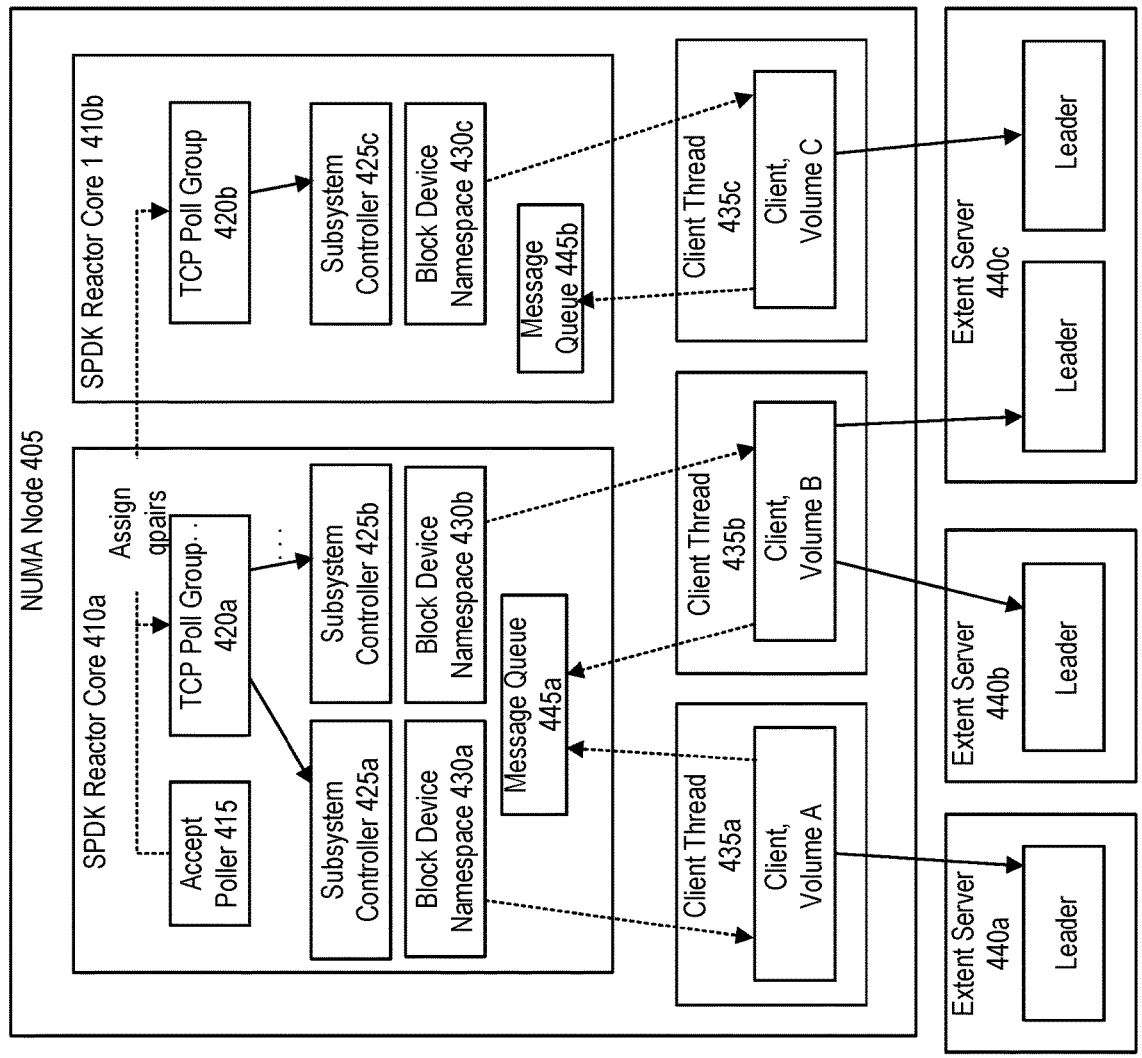
FIG. 4 is a diagram of a Non-Volatile Memory Express (NVMe)/Transmission control Protocol (TCP) target.

FIG. 4 is a diagram 400 of a Non-Volatile Memory Express (NVMe)/Transmission control Protocol (TCP) target according to an embodiment. The NVMe/TCP target (e.g., NVMe/TCP target 320b) can be a Non-Uniform Memory Access (NUMA) node 405 that can include a central processing unit coupled with memory. Cores in the NUMA node 405 CPU can be assigned to one or more SPDK reactor cores such as SPDK reactor cores 410a-b (e.g., SPDK reactor 335). Accept poller 415 can accept new connections to the SPDK reactor and assign the new connections to a SPDK reactor core (e.g., SPDK reactor core 410a). Accept Poller 415 can assign new connections to an available TCP poll group 420a-b in an available SPDK reactor core 410a-b, and the new connections can be assigned using a round robin algorithm.

Subsystem controllers 425a-c can be assigned to a new connection, and, for example, subsystem controller 425a can be assigned for a connection made with TCP poll group 420a. More than one subsystem controller 425a-c can be assigned to one of the TCP poll groups 420a-b, and, for instance, subsystem controller 425a and subsystem controller 425b can be assigned to TCP poll group 420a. Block device namespaces 430a-c can be generated when a connection is made with one of the subsystem controllers 425a-c.

Threads in a NUMA node CPU can be assigned as client threads 435a-c by one of the block device namespaces. Block device namespaces 430a-c can forward a request that is received through the new connection to one of the client threads 435a-c, and client threads 435a c can decide which extent server 440a-c (e.g. extent servers 140A-F) should receive the data associated with the request. After completing the request, client threads 435a-c can send a response to message queue 445a-b to indicate that a request has been completed. Requests can be received at a SPDK reactor core 410a-b from the smartNIC initiator (e.g., NVMe/TCP initiator 325, NVMe initiator 280, etc.) or a different initiator (e.g., iSCSI initiator 250). Responses can be sent from one of the SPDK reactor cores 410a-b to the smartNIC initiator or a different initiator.

Figure 5:
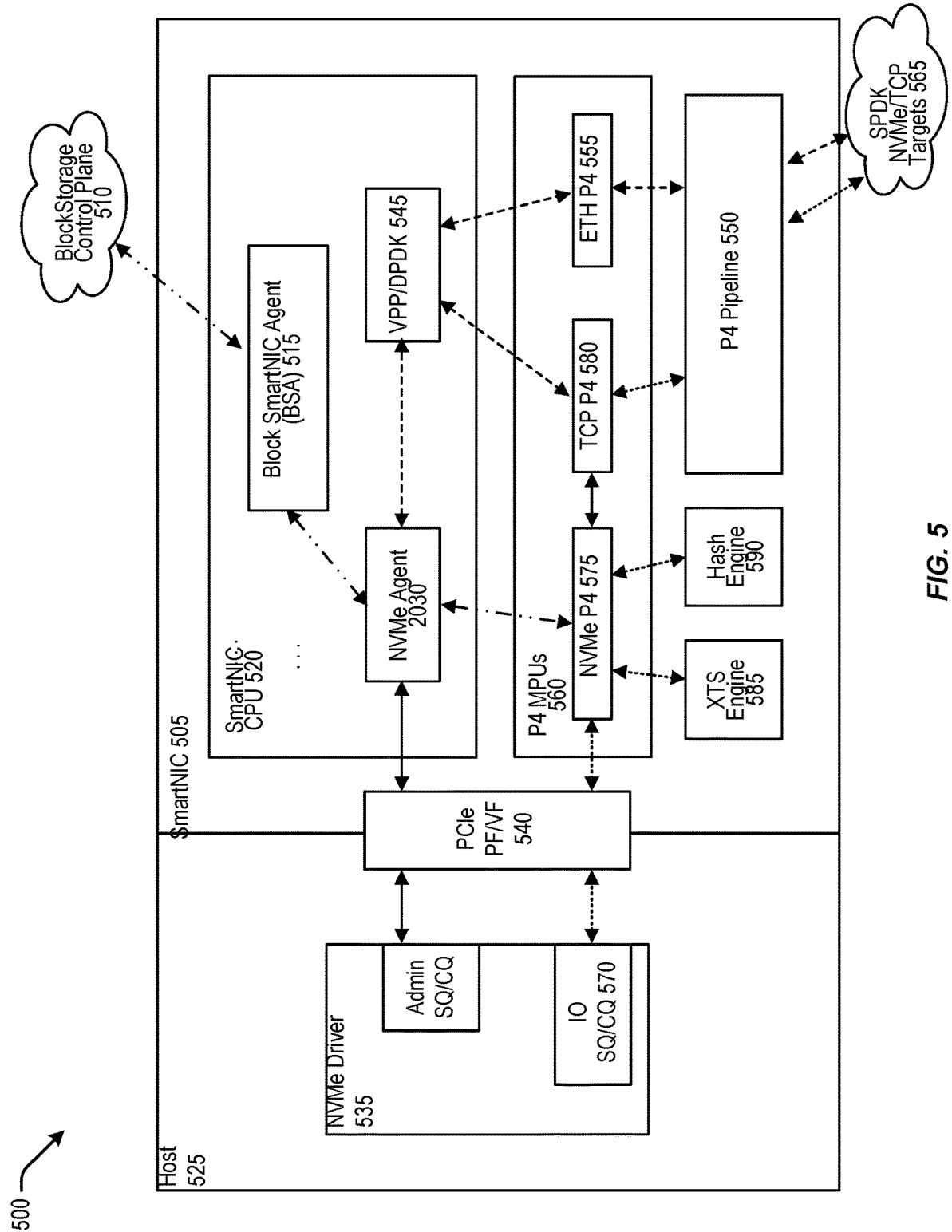
FIG. 5 is a simplified diagram of a smart network interface card (smartNIC) with Non-Volatile Memory Express (NVMe).

FIG. 5 is a simplified diagram 500 of a smart network interface card (smartNIC) with Non-Volatile Memory Express (NVMe) according to an embodiment. Requests can be received at smartNIC 505 (e.g. NVD 130) from the block storage control plane agent 510 (sometimes called a block storage shadow service 510, e.g., block storage shadow service 155) in the control plane (e.g., block storage control plane 125, control plane 305, etc.). The requests can be received at the block smartNIC agent (BSA) 515 (e.g., BSA 160) running on the smartNIC central processing unit (CPU) 520. BSA 515 can serve a number of functions including performing health checks, ensuring that targets are available, or performing telemetry. BSA 515 forwards instructions or requests to the host 525, or other smartNIC components, via NVMe Agent 530. Requests or instructions can be sent from NVMe Agent 530 to the NVMe driver 535 via a PCIe physical function or virtual function (PF/VF) 540 (e.g., VF 360).

The NVMe agent 530 can establish a new I/O connection in response to a request from BSA 515 using the vector packet processing/dataplane development kit (VPP/DPDK) module 545. The VPP/DPDK module can use a framework, such as VPP with the DPDK plugin, to process and route network packets. Upon receiving a request from NVMe agent 530, VPP/DPDK 545 can send a request to the P4 pipeline 550 (e.g., P4 pipeline 330) via the Ethernet (ETH) P4 module 555 running on the P4 match protection unit (MPU) 560. P4 pipeline 550 can establish an I/O connection with SPDK NVMe/TCP targets 565 (e.g., target 230, target fleet 145, NVMe/TCP target 320a-c, etc.). Establishing a connection can include sending instructions to NVMe driver 535 or SPDK NVMe/TCP targets 565.

The I/O communication can be offloaded to a fast path I/O pipeline after an I/O connection is established with an SPDK NVMe/TCP target 565. The I/O fast path traffic can travel along the fast path pipeline from the I/O submission queue/completion queue (SQ/CQ) 570 in host 525 to P4 MPUs 560 via PCIe PF/VF 540. I/O traffic can be received in P4 MPUs 560 at NVMe P4 575 and forwarded to the SPDK NVMe/TCP targets 565 via TCP P4 580 and P4 pipeline 550. Traffic in I/O SQ/CQ 570 can start from the submission queue and end at the completion queue when I/O completes. If traffic along the fast path pipeline fails, NVMe P4 575 or TCP P4 580 can inform NVMe Agent 530 of the failure. NVMe agent 530 can be configured so that NVMe agent can create a new I/O connection in response to the failure and offload the new connection to the fast path pipeline. XTS engine 585 is an encryption engine that can encrypt user data using the xor-encrypt-xor (XEX)-based tweaked-codebook mode with ciphertext stealing (XTS) block cypher, and hash engine 2090 can use cryptographic hash functions to verify data integrity.

Figure 6:
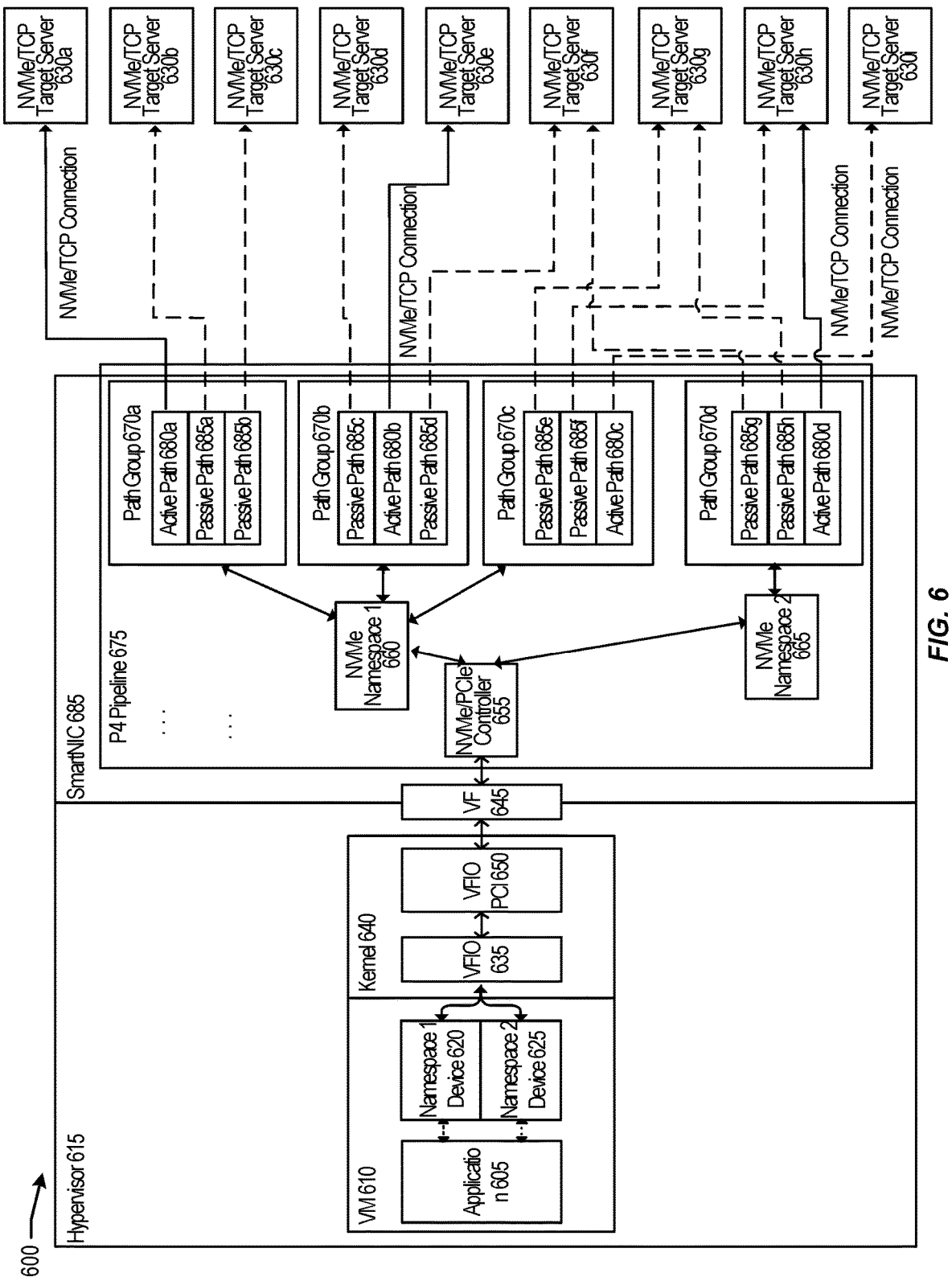
FIG. 6 is a diagram showing multipath handling in a smart network interface card (smartNIC).

FIG. 6 is a diagram 600 showing multipath handling in a smart network interface card (smartNIC) according to an embodiment. An application 605 can run in a virtual machine (VM) 610 managed by a hypervisor 615. Application 605 can be similar to application 620, and VM 610 can be a bare metal machine (e.g., BM/VM instance 340). Two namespaces devices, namespace 1 device 620 and namespace 2 device 625, can be associated with Application 605. A namespace can be a NVM storage that is formatted for block access. A namespace can be analogous to a logical unit in SCSI, and a block storage volume can be a single namespace. Traffic between namespace 1 620 or namespace 2 625 and the NVMe/TCP target servers 630a-i (e.g., target server 150) can be received via the virtual function input/output queue (VFIO) 635 in the kernel 640. The virtual function (VF) 645 can be connected to VFIO 635 via the VFIO peripheral component interconnect (PCI) 650. VF 645 can be a virtual function or a physical function.

The NVMe/PCIe controller 655 can route traffic from the namespace devices to NVMe namespaces. For instance, traffic can be routed between namespace device 1 620 and NVMe namespace 1 660, and traffic can be routed between namespace device 2 625 and NVMe namespace 2 665. The namespace devices can be associated with one or more path groups 670a d located in the P4 pipeline 675 (e.g., P4 pipeline 550, P4 MPUs 560, etc.) in smartNIC 680 (e.g., smartNIC 165, smartNIC 270, smartNIC 505, etc.). For instance, NVMe namespace 1 660 can route traffic to path groups 670a-c, and NVMe namespace 2 665 can route traffic to path group 670d.

Path groups can contain an active path 680a-d and one or more passive paths 685a-h. Active paths 680a-d or passive paths 685a-h can be associated with a NVMe/TCP target server 630a-i. Traffic between a NVMe/TCP target server 630a-i and namespace device 1 2120 or namespace device 2 2125 can be routed via active paths 680a-d. NVMe/TCP target servers 630a-i can route traffic to and from extent servers (e.g., extent servers fleet 140, extent servers 440a c, etc.).

Traffic can be routed via a passive path 685a-h if an active path 680a-d fails. In response to a failure, passive path 685a-h can login to an extent server via NVMe/TCP target servers 630a-h. The extent server can change a token from the token for an active path 680a-d to a token for a passive path 685a-h. The extent server can use the token to determine whether to accept traffic from a path (e.g., active paths 680a-d or passive paths 685a-h).

Figure 7:
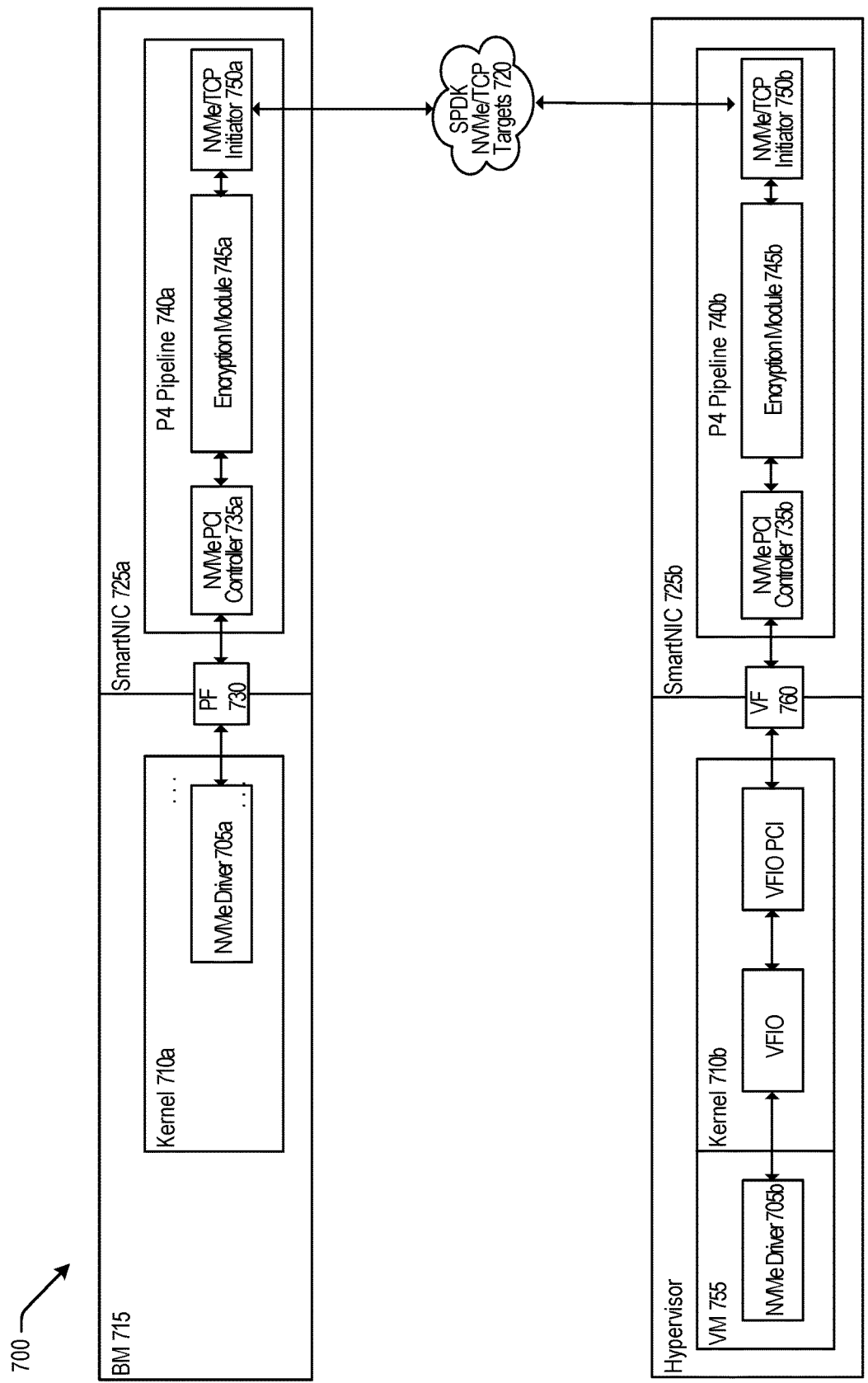
FIG. 7 shows a diagram of an architecture for performing encryption/decryption with a smart network interface card (smartNIC).

FIG. 7 shows a diagram of an architecture 700 for performing encryption/decryption with a smart network interface card (smartNIC) according to an embodiment. The architecture 700 can provide a unified means for encrypting/decrypting both VM and BM traffic. NVMe driver 705a can run in the kernel 710a of a bare metal (BM) machine 715 (e.g., BM/VM instance 340, etc.). Traffic can be sent from NVMe driver to SPDK NVMe/TCP targets 720 via smartNIC 725a. The BM traffic can be received via a physical function (PF) 730 (e.g., PCIe PF/VF 540, etc.) at the NVMe PCI controller 735a (e.g., NVMe/PCIe controller 655, NVMe P4 575, etc.) in the P4 pipeline 740a (e.g., P4 MPUs 560, P4 pipeline 550, etc.).

Outgoing BM traffic traveling from NVMe driver 705a to SPDK NVMe/TCP targets 720 can be encrypted by the encryption module 745a in smartNIC 725a, and incoming BM traffic can be decrypted by the encryption module 745a. Encryption module 745a can encrypt or decrypt traffic using an encryption algorithm such as Advanced Encryption Standard (AES). The encrypted BM traffic can be sent to SPDK NVMe/TCP targets 720 via the NVMe/TCP initiator 750a (e.g., NVMe initiator 280, NVMe/TCP initiator 325, etc.). Incoming encrypted BM traffic from SPDK NVMe/TCP targets 720 can be received at NVMe/TCP initiator 750a before being forwarded along the pathway to NVMe driver 705a. Incoming encrypted BM traffic can be decrypted by the encryption module 745a.

Outgoing VM traffic can be sent from NVMe driver 705b in the virtual machine (VM) 755 (e.g., BM/VM instance 340, VM 810, etc.) to the virtual function input/output (VFIO) 760 in kernel 710b via a virtual function (VF) 760 (e.g., VF 360, VF 645, etc.). The outgoing VM traffic can be forwarded to NVME PCI controller 735b in P4 pipeline 740b. The outgoing VM traffic can be forwarded from smartNIC 725b to SPDK NVMe/TCP targets 720 via encryption module 745b and NVMe/TCP initiator 750b. Incoming VM traffic from SPDK NVMe/TCP targets 720 can be received at NVMe/TCP initiator 750b before the incoming traffic is forwarded along the pathway to NVMe driver 705b. Incoming encrypted VM traffic can be decrypted by the encryption module 745a.

Examples of Operations for Distributed Storage of Data by an NVD (smartNIC) on One or More Extent Servers In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure generally relates to block storage of data. More specifically, but not by way of limitation, this disclosure relates to using network virtualization devices ("NVDs") for distributed storage of data on multiple extent servers.

As used herein, the term "NVD" is interchangeable with the term "smartNIC." Examples of NVDs (e.g. smartNICs) are described herein with respect to FIG. 1 (e.g. smartNIC 165), FIG. 2 (e.g. smartNIC 270), FIG. 3, FIG. 4, FIG. 5 (e.g. smartNIC 505), FIG. 6 (smartNIC 685), and FIG. 7 (e.g. smartNIC 725a and smartNIC 725b) and text describing these figures. In certain embodiments, the NVD, in addition to the features described herein in FIGS. 8-12 and text describing FIGS. 8-12, can perform one or more functions of the example NVDs described in FIGS. 1-7 and the text describing FIGS. 1-7. Further, the NVD (smartNIC) also performs storage related functions and functions as a block virtualization device.

An NVD (smartNIC) is described that is configured to receive storage write requests from a compute instance of a host machine, perform data striping on data included in the storage write requests, and perform storage operations by communicating with multiple extent servers to store data stripes. The NVD is configured to receive confirmation from each of the multiple extent servers that a respective data stripe associated with a storage write request has been stored on a physical storage device accessible to the respective extent server and provide, to the compute instance, confirmation that the data included in the storage write request was successfully stored.

As previously discussed, conventional data storage techniques may involve a host machine routing storage write requests received from a compute instance to a target server, which stripes the data and communicates the data stripes for storage by multiple extent storage servers. Unlike these conventional data storage techniques, the techniques described herein involve performing, by an NVD coupled to the host machine, data storage operations including receiving a storage write request from a compute instance of the host machine, data striping of data included in the storage write request, communicating with multiple extent servers to store data stripes generated via the data striping and receiving confirmation from the multiple extent servers of successful storage of the data stripes.

According to the techniques described herein, data storage operations are performed for a compute instance on a host machine by an NVD that is coupled to the host machine. The NVD receives a storage write request including data to be stored from a compute instance of the host machine, stripes the data into data stripes, and sends the data stripes to multiple extent servers for storage. Usage of the NVD to perform reception of storage write requests, data striping, and data stripe routing operations, according to techniques described herein, avoids bottlenecking or other delays that may occur with conventional usage of a target server to perform storage operations including striping data into data stripes and routing the data stripes to multiple extent servers for storage. The processing performed by the NVD to receive storage write requests including data to be stored, stripe the data into data stripes, and route the data stripes to multiple extent servers decrease a wait time for client services to store, modify, or otherwise access data compared to use of the conventional system, and also reduce network utilization compared to use of the conventional system.

Figure 8:
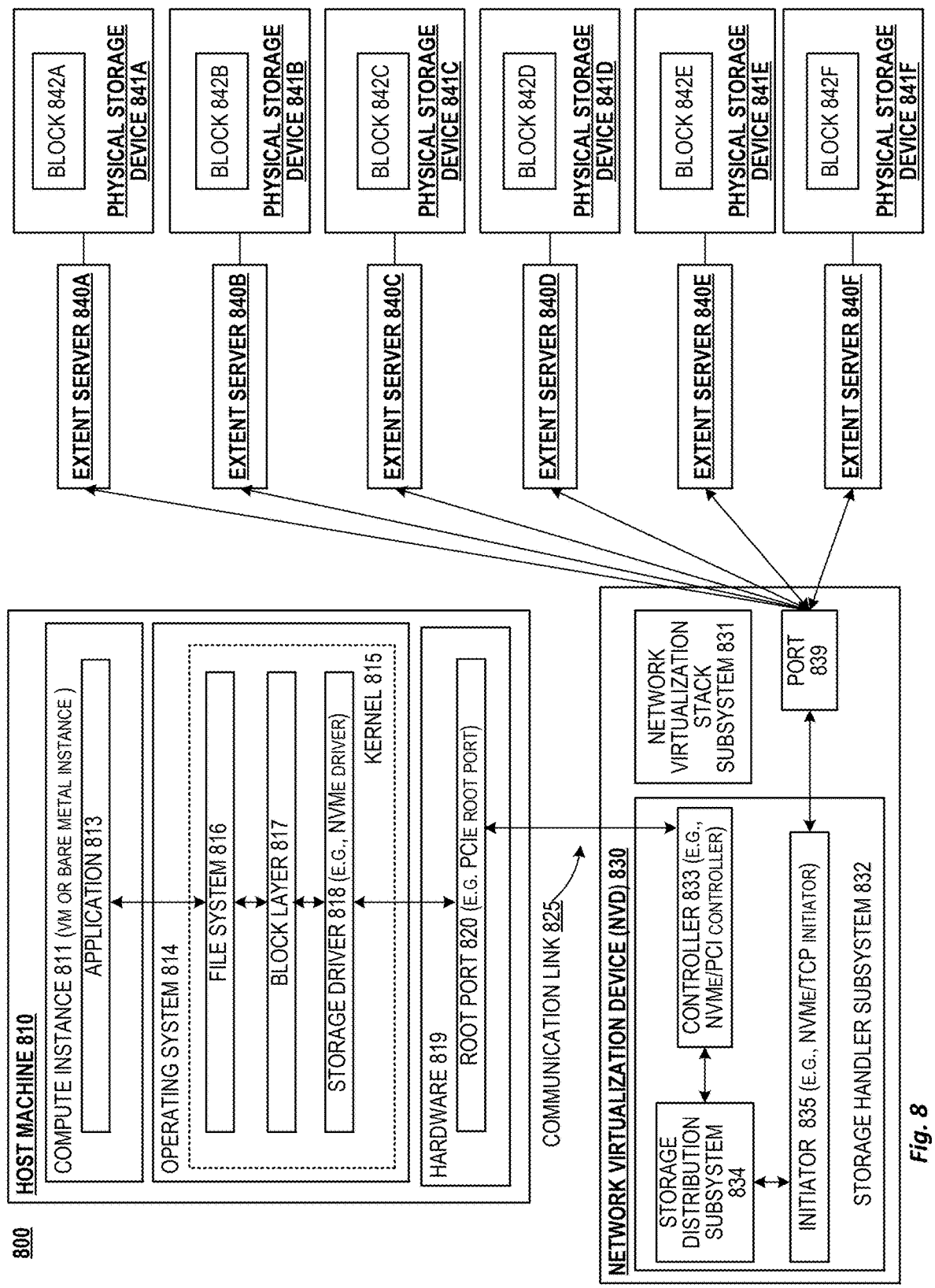
FIG. 8 depicts a computing environment for distributed storage, by an NVD, of data on physical storage devices accessible to one or more extent servers, according to certain embodiments.

FIG. 8 depicts a computing environment 800 for distributed storage, by an NVD 830, of data on one or more extent servers, according to certain embodiments. The example computing environment 800 includes a host machine 810 (e.g. host server 205) that communicates with the NVD 830 (e.g. smartNIC 270) via a communication link 825 (e.g. peripheral component interchange express (PCIe) link 825). The NVD 830 communicates with one or more extent servers 840 (e.g. NVMe/TCP target servers 630a-630i), as depicted in FIG. 8, for example, with extent servers 840A, 840B, 840C, 840D, 840E, and 840F. In an example embodiment, the NVD 830 communicates, using a port 839 and via a network, with the one or more extent servers 840.

An example host machine 810 executes a compute instance 811. The compute instance could either be a virtual machine or a bare metal instance. An example compute instance 811 (e.g. a virtual machine or a bare metal instance) may run on an operating system 814 of the host machine 810, which executes on hardware 819 of the host machine 810. An application 813 may execute on the compute instance 811. The application 813 could be a client application, for example, an email application, a database application, or other service application that may need to store data and/or access stored data. A user of the application 813 may interact with the application 813 in the compute instance 811, for example, via a user interface of the host machine 810 or via a user interface of a computing device (e.g. a mobile device) that is communicatively coupled to the host machine 810.

In certain embodiments, the kernel 815 (e.g. kernel space, kernel 215) of the host machine 810 operating system 814 includes a file system 816 (e.g. file system 210), a block layer 817 (e.g. block 235), and a storage driver 818. In certain embodiments, however, the kernel 815 is a kernel space of the compute instance 811. When the application 813 is accessing data, the file system 816 may receive a storage write request (e.g. an I/O request or other data request etc.) along with data for storage. The file system 816 may forward the storage write request to a block layer 817 of the kernel 815. The block layer 817 of the kernel 815 may implement an interface used by the file system 816 to access storage devices, including the storage driver 818 (e.g. NVMe driver). The storage driver 818 may implement a communication specification (e.g. an NVMe specification) to communicate with solid state drive (SSDs), for example, PCIe-based SSDs, The storage driver 818 may transmit the data for storage (e.g. packets of data for storage) associated with the storage write request via the root port 820 (e.g. a PCIe root port) over the communication link 825 (e.g. a PCIe link) to the storage handler subsystem 832 of the NVD 830. The storage driver 818 may also receive data from the storage handler subsystem 832 of the NVD 830 via the communication link 825 and the root port 822.

An example NVD 830 includes a network virtualization stack subsystem 831, a storage handler subsystem 832, and a port 839. The NVD 830 may comprise a similar architecture to (e.g. have similar components and subcomponents to) and perform functions or operations similar to network virtualization devices (smartNICs) described herein, including one or more of smartNICs described in FIG. 1 (e.g. smartNIC 165), FIG. 2 (e.g. smartNIC 270), FIG. 3, FIG. 4, FIG. 5 (e.g. smartNIC 505), FIG. 6 (smartNIC 685), and FIG. 7 (e.g. smartNIC 725*a* and smartNIC 725*b*). smartNICs described in FIGS. 1-7.

The network virtualization stack subsystem 831 may perform one or more of the functions or operations as performed by such network virtualization devices described herein, for example, functions or operations described herein as being performed by one or more of the smartNICs described in FIG. 1 (e.g. smartNIC 165), FIG. 2 (e.g. smartNIC 270), FIG. 3, FIG. 4, FIG. 5 (e.g. smartNIC 505), FIG. 6 (smartNIC 685), and FIG. 7 (e.g. smartNIC 725*a* and smartNIC 725*b*). For example, the network virtualization stack subsystem 831 may facilitate reception by the NVD 830 of packets and frames from the host machine 810 (e.g., packets and frames generated by a compute instance 811 hosted by the host machine) via a host-facing port and, after performing the necessary packet processing, may forward the packets and frames to a TOR switch via a network-facing port of the NVD 830. The network virtualization stack subsystem 831 may facilitate reception by the NVD 830 of packets and frames from a TOR switch via a network-facing port of the NVD 830 and, after performing the necessary packet processing, may forward the packets and frames to a host machine via a host-facing port of the NVD 830. The network virtualization stack subsystem 831 may implement or perform network virtualization functions. These functions are performed by software/firmware executed by the NVD 830. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, the network virtualization stack subsystem 831 executes a packet processing pipeline for processing the packet and determining how the packet is to be forwarded or routed. As part of this packet processing pipeline, the network virtualization stack subsystem 831 may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions. In certain embodiments, the packet processing data path may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD 830. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines. The network virtualization stack subsystem 831 may perform both control plane and data plane functions corresponding to a control plane and a data plane of a VCN. In certain embodiments, the network virtualization stack subsystem 831 intercepts all network packets in and out of host machines and perform network virtualization functions. The network virtualization stack subsystem 831 may execute various virtualization functions including VNICs and VCN VRs. The network virtualization stack subsystem 831 may execute VNICs associated with the compute instances hosted by one or more host machines connected to the VNIC. The network virtualization stack subsystem 831 may execute VCN Virtual Routers corresponding to the VCNs of the compute instances. The network virtualization stack subsystem 831 may execute various software (e.g., daemons) and include one or more hardware components that facilitate the various network virtualization functions performed by the NVD 830.

An example storage handler subsystem 832 includes a controller 833, a storage distribution subsystem 834, and an initiator 835. An example controller 833 communicates with the host machine 810 to receive data for storage along with a storage write request. The controller 833 may use a communication protocol (e.g. an NVMe specification) to communicate with the host machine 810. The controller 833 may receive the storage write request and the data for storage from the storage driver 818 via the communication link 825 established between the root port 820 of the host machine 810 and the storage handler subsystem 832 of the NVD 830. In some instances, the controller 833 communicates with the host machine 810 to receive a storage read request.

In some embodiments, the storage distribution subsystem 834 generates, from data for storage received from the controller 833, one or more data stripes using a striping algorithm (e.g. RAID0 striping algorithm). The storage distribution subsystem 834 may assign each of the one or more data stripes to a respective extent server 840 of a plurality of extent servers 840. In certain examples, where the controller 833 receives a storage read request from the host machine 810, the storage distribution subsystem 834 identifies a set of extent servers 840 storing data stripes associated with the storage read request.

In certain embodiments, the storage distribution subsystem 834 includes a leader monitoring application which periodically determines, for each of multiple extent server groups, which extent server 840 to identify as an apparent leader extent server 840 by communicating with the one or more extent servers 840 of the respective extent server group. In some embodiments, each respective extent server 840 is associated with a group of extent servers 840 including a leader extent server 840 and one or more non-leader extent servers 840 and the storage distribution subsystem 834 assigns each data stripe to a respective extent server group. For example, the storage distribution subsystem 834 assigns a first data stripe to extent server group I (comprising extent servers 840A, 840B, and 840C) and a second data stripe to extent server group II (comprising extent servers 840D, 840E, and 840F). The storage distribution subsystem 834 may identify a leader server of the extent server group to which the NVD 830 will communicate the respective data stripe. In some embodiments, the storage distribution system 843 maintains and periodically updates a list identifying an apparent leader extent server 840 for each extent server group.

The storage distribution subsystem 834 may communicate each of the one or data stripes to an initiator 835, along with an identification of a target extent server 840. The target extent server may comprise the respective extent server 840 to which the storage distribution subsystem 834 assigned the stripe or an apparent leader extent server 840 associated with an extent server group to which the storage distribution subsystem 834 assigned the stripe.

An example initiator 835 (e.g. NVMe/TCP initiator) receives one or more data stripes from the storage distribution subsystem 834 along with an identification of a target extent server 840 for each of the received data stripes. The initiator 835 may communicate each received data stripe to the extent server 840 assigned to the stripe by the storage distribution subsystem 834. The initiator may employ a communication interface and a communication protocol (e.g. NVMe protocol, TCP protocol) to communicate a data stripe to a target extent server 840 over a network.

An example port 839 enables the NVD 830 to communicate, via a network, with one or more extent servers 840, for example, extent servers 840A, 840B, 840C, 840D, 840E, and 840F as depicted in FIG. 8.

Each of the example extent servers 840 (e.g. extent servers 840A, 840B, 840C, 840D, 840E, and 840F) is communicatively coupled to or may otherwise access a respective physical storage device 841 (e.g. physical storage devices 841A, 841B, 841C, 841D, 841D, 841E, and 841F), each respective physical storage device 841 comprising a physical storage block 842 (e.g. blocks 842A, 842B, 842C, 842D, 842E, and 842F). Each extent server 840 can communicate with the NVD 830 via a network to receive one or more data stripes for storage. An example of a physical storage device 841 includes a physical device for storing one or more data stripes, such as tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

A block 842 is a portion of storage space. Blocks can be of a predetermined size, for example, 512 bytes, 1 kilobyte (K), 4K, or other predefined portion of storage space on a physical storage device 841. For example, the six physical storage devices 841A, 841B, 841C, 841D, 841E, and 841F depicted in FIG. 8 include respective blocks 842A, 842B, 842C, 842D, 842E, and 842F. Though only a single block 842 is depicted in each of the physical storage devices 841 of FIG. 8, a physical storage device 841 may include multiple blocks. A total number of blocks on a physical storage device 841 may depend on a total storage space on the physical storage device 841 and the amount of storage space in each block 842.

Although the examples provided herein involve storage write requests, the examples are also applicable to other types of requests, including but not limited to read requests, delete requests, update requests, and create requests.

Figure 9:
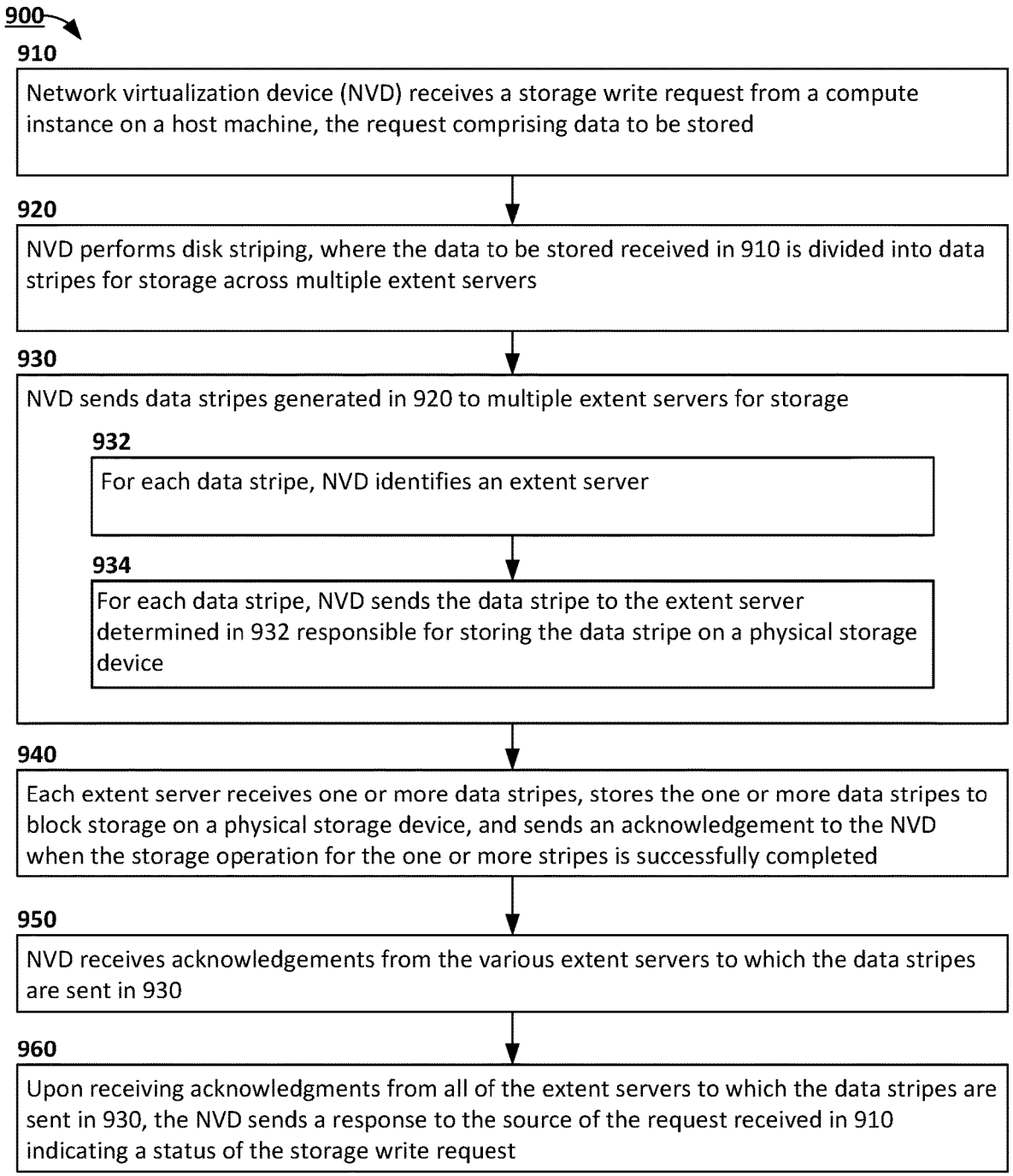
FIG. 9 depicts a method for striping, by an NVD, data received in a data write request from a compute instance of host machine for storage on one or more extent servers, according to certain embodiments.

FIG. 9 depicts an example of a method 900 for striping, by an NVD 830, data received in a data write request from a compute instance 811 of a host machine 810 for storage on one or more extent servers 840. For illustrative purposes, the method 900 is described with reference to the components illustrated in FIG. 8, although other implementations are possible. For example, the program code for the storage handler subsystem 832, which is stored in a non-transitory computer-readable medium, is executed by one or more processing devices to cause the NVD 830 to perform one or more operations described herein.

At block 910, the method 900 involves receiving, by a network virtualization device (NVD) 830, a storage write request from a compute instance 811 on a host machine 810, the request comprising data to be stored. In certain examples, the storage write request originates on an application 813 executing in the compute instance 811. The controller 833 (e.g. an NVMe/PCIe controller) may manage or direct the receiving of the storage write request and the data for storage received over the communication link 825 by the storage handler subsystem 832 of the NVD 830.

At block 920, the method 900 involves performing, by the NVD 830, disk striping, where the data to be stored received in block 910 is divided into data stripes for storage across multiple extent servers 840. The storage distribution subsystem 834 of the NVD 830 may use a striping algorithm for distributed storage across multiple servers, for example, a redundant array of independent disks striping ("RAID 0") algorithm. For example, the storage distribution subsystem 834 uses the striping algorithm to divide the received data into stripes. The storage distribution subsystem 834 may assign the stripes across multiple extent servers 840. In an example, the storage distribution subsystem 834, using the striping algorithm, divides 3K of received data to generate three 1K data stripes including data stripe A, data stripe B, and data stripe C. In certain embodiments, a size of the stripes corresponds to an amount of data associated with a block of a physical storage device accessible to an extent server 840 (e.g. an example stripe A corresponds to block 842A of physical storage device 841A accessible to extent server 840A, an example stripe B corresponds to block 842B of physical storage device 841B accessible to extent server 840B, and an example stripe C corresponds to block 842C of physical storage device 841C accessible to extent server 840C). In other embodiments, the size of the stripe does not correspond to the amount of data associated with a block of the physical storage device. For example, a size of a data stripe is less than a size of a single block on the physical storage device and a single block is able to store multiple data stripes of a particular size.

At block 930, the method 900 involves sending, by the NVD 830, the data stripes generated in block 920 to the multiple extent servers 840 for storage. The storage distribution subsystem may identify extent servers 840 to which to assign data stripes. For example, the storage distribution subsystem 834, from received data for storage, generates data stripes A, B, and C using the striping algorithms. In this example, the storage distribution subsystem 834 assigns data stripe A to extent server 840A, assigns data stripe B to extent server 840B, and assigns data stripe C to extent server 840C. In certain examples, the storage distribution subsystem 834 encrypts the stripes that were generated using the striping algorithm. The storage distribution subsystem 834 may forward, to the initiator 835, the data stripes generated using the striping algorithm. The initiator 835 may manage or direct communication of each of the data stripe to the respective assigned extent server 840 via a port 839.

In certain embodiments, implementing block 930 involves performing sub-blocks 932 and 934. In sub-block 932, the method for implementing block 930 of the method 900 involves identifying, by the NVD 830 for each generated data stripe, an extent server. In certain examples, the storage distribution subsystem 834 generates a set of data stripes and allocates the generated data stripes evenly among a set of extent servers 840. For example, the storage distribution subsystem 834 generates, from input data using the striping algorithm, six data stripes A, B, C, D, E, F and assigns these data stripes to extent servers 840A, 840B, 840C, 840D, 840E, and 840F, respectively. In a case where more stripes are generated than a number of extent servers 840 to which the NVD 830 is allocating data stripes, the storage distribution subsystem 834 may assign data stripes to extent servers 840 on a rotational basis. For example, the storage distribution subsystem 834 generates, using the striping algorithm, eight data stripes A, B, C, D, E, F, G, and H. In this example, the storage distribution subsystem 834 assigns, as in the previous example, data stripes A, B, C, D, E, F to extent servers 840A, 840B, 840C, 840D, 840E, and 840F, respectively. In this example, the storage distribution subsystem 834 further assigns data stripe G to extent server 840A and data stripe H to extent server 840B. The storage distribution subsystem 834 may generate an identifier for each data stripe and log the identifier in a data log along with an identifier for the extent server 840 to which the data stripe was assigned.

In sub-block 934, the method for implementing block 930 of the method 900 involves sending, by the NVD 830 for each generated data stripe, the data stripe to the extent server determined in sub-block 934 responsible for storing the data stripe on a physical storage device 841. The storage distribution subsystem 834 may forward, to the initiator 835, the data stripes generated using the striping algorithm. The initiator 835 may manage or direct communication of each of the data stripes to the respective assigned extent server 840 using the port 839. In certain examples, the initiator 835 communicates, via the port 839 and over a network, with one or more extent servers 840 to which the data stripes are assigned. In certain examples, the initiator 835 uses an NVMe interface and TCP communication protocol to communicate with the one or more extent servers 840. In certain embodiments, the initiator 835 encrypts each of the data stripes prior to communicating the data stripes to the assigned extent servers 840.

At block 940, the method 900 involves, by each extent server 840 receiving one or more data stripes, storing the one or more data stripes in block storage 842 on a physical storage device 841, and sending, to the NVD 830, an acknowledgment when the storage operation for the one or more data stripes is successfully completed. Each extent server 840 may communicate with the initiator 835 of the NVD 830 to receive its assigned data stripe via the port 839 and the network from the NVD 830. Each extent server 840 may store its received data stripe to a physical storage device 841 for storage on a block 842. The physical storage device 841 may be a component of the extent server 840 or may be separate from but also communicatively coupled to or otherwise accessible to the extent server 840. Each of the one or more extent servers 840, in response to successfully storing a respective data stripe on a respective block 842 of a respective physical storage device 841, may transmit an acknowledgement to the NVD 830 that the received data stripe was successfully stored.

In an example, the storage handler subsystem 832 communicates data stripes A, B, C, D, E, and F generated using the data striping algorithm to extent servers 840A, 840B, 840C, 840D, 840E, and 840F, respectively. In this example, each extent server 840A, 840B, 840C, 840D, 840E, and 840F communicates with the initiator 835 of the storage handler subsystem 832 of NVD 830 via the port 839 to receive the respective data stripe A, B, C, D, E, and F. Each extent server 840A, 840B, 840C, 840D, 840E, and 840F writes its received data stripe (A, B, C, D, E, and F, respectively) to its respective physical storage device 841 (841A, 841B, 841C, 841D, 841E, and 841F, respectively) for storage on a respective block 842 (842A, 842B, 842C, 842D, 842E, and 842F, respectively) of its respective physical storage device 841. Each extent server 840A, 840B, 840C, 840D, 840E, and 840F transmits, respectfully, after successfully storing the data stripe in the physical storage device 841, an acknowledgement to the NVD 830 that the received data stripe was successfully stored on the physical storage device 841 block 842.

At block 950, the method 900 involves, receiving, by the NVD 830, acknowledgments from the various extent servers 840 to which the data stripes are sent in block 930. The initiator 835 may manage or direct communication between the NVD 830 and each of the extent servers 840. The initiator 835 of the NVD 830 receives, using the port 839, an acknowledgment from each extent server 840 to which a data stripe was transmitted. For example, initiator 835 of the NVD 830 receives, using the port 839, an acknowledgment from each of extent servers 840A, 840B, 840C, 840D, 840E, and 840F confirming that the corresponding data stripe A, B, C, D, E, F, was stored by the corresponding extent server 840A, 840B, 840C, 840D, 840E, and 840F. The storage handler subsystem 832 may monitor for reception of acknowledgments of storage of data stripes by extent servers 840 and determine, for a storage write request, when acknowledgments are received by the NVD 830 from all extent servers 840 to which data stripes were transmitted.

At block 960, the method 900 involves, upon receiving acknowledgments from all of the extent servers 840 to which the data stripes are sent in block 930, sending, by the NVD 830, a response to the source of the request received in block 910 indicating a status of the storage write request. For example, for a storage write request, the storage handler subsystem 832 communicated data stripes to multiple extent servers and received an acknowledgment from each of the multiple extent servers. In certain examples, the storage write request originated at an application 813 or other program executing on the compute instance 811 operating on the host machine 810 and the storage handler subsystem 832 communicates the response to the application 813 or other program. Communicating the response to the application 813 or other program executing on the compute instance 811 may involve communicating, using the controller 833 with the storage driver 818 of the kernel 815 via the communication link 825 and the root port 820 of the host machine 810, where the storage driver 818 forwards the response to the application 813 or other program executing on the compute instance 811.

Figure 10:
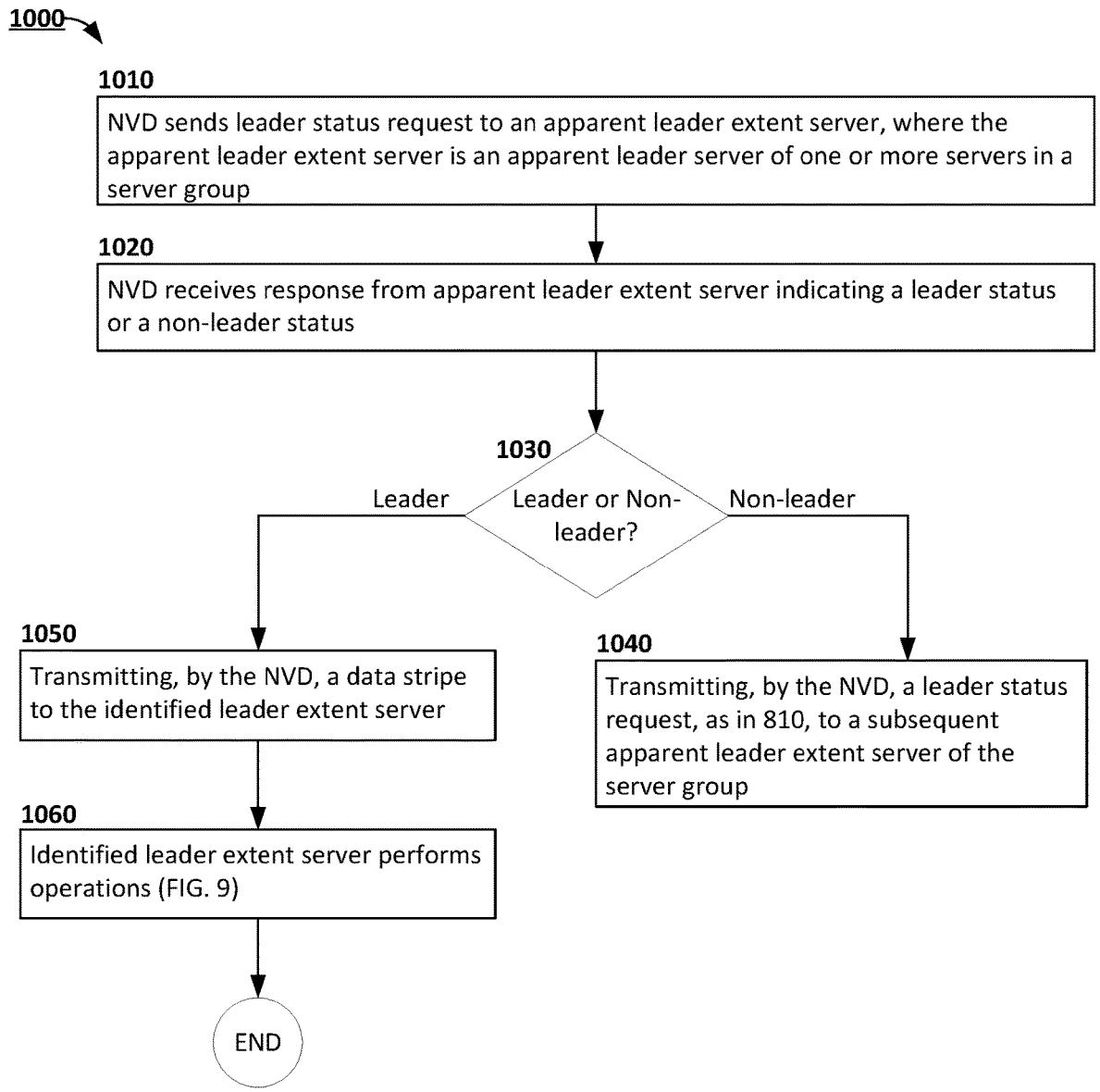
FIG. 10 depicts a method for identifying, by an NVD, a leader extent server of a group of extent servers and transmitting, by the NVD, a data stripe generated via the method described in FIG. 9 to the identified leader extent server, according to certain embodiments.

In certain embodiments, the NVD 830 does not receive acknowledgments from all of the extent servers 840 to which the data stripes are sent in block 730, and the NVD 830 repeats blocks 930, 940, and 950 until acknowledgments are received from all extent servers 840. For example, for each extent server 840 from which the NVD 830 did not receive a respective acknowledgment, the NVD 830 repeats blocks 930, 940, and 950 until the NVD 830 receives the respective acknowledgment from the extent server 840, FIG. 10 depicts an example of a method 1000 for identifying, by an NVD 830, a leader extent server 840 of a group of extent servers 840 and transmitting, by the NVD 830, a data stripe generated via the method described in FIG. 9 to the identified leader extent server 840. For illustrative purposes, the method 1000 is described with reference to the components illustrated in FIG. 8, although other implementations are possible. For example, the program code for the storage handler subsystem 832, which is stored in a non-transitory computer-readable medium, is executed by one or more processing devices to cause the NVD 830 to perform one or more operations described herein.

In some embodiments, instead of assigning the data stripes generated via the striping algorithm to specific extent servers 840, the storage distribution assigns the data stripes to extent server groups. For example, an extent server group includes a leader extent server 840 and one or more non-leader extent servers 840. In an extent server group, each of the extent servers 840 periodically or continuously communicate with each other to determine which extent server 840 is the leader extent server 840 and leadership of the extent server group may change over time. In these embodiments involving extent server groups, after applying a striping algorithm to data for storage associated with a data write request, the storage distribution subsystem 834 assigns each data stripe to a respective extent server group. In an example, the storage distribution subsystem 834 generates, from the received data and using the striping algorithm, two data stripes and assigns a first data stripe to extent server group I (comprising extent servers 840A, 840B, and 840C) and a second data stripe to extent server group II (comprising extent servers 840D, 840E, and 840F). The storage distribution subsystem 834 may identify, for each data stripe, a leader server of the extent server group to which the NVD 830 will communicate the respective data stripe. For example, the storage distribution subsystem 834 maintains a list identifying an apparent leader extent server 840 for each extent server group. In certain embodiments, the storage distribution subsystem 834 includes a leader monitoring application which periodically determines, for each extent server group, which extent server 840 to identify as the apparent leader extent server 840 by communicating with one or more extent servers 840 of the respective extent server group.

At block 1010, the method 1000 involves sending, by the NVD 830, a leader status request to an apparent leader extent server 840, where the apparent leader extent server 840 is an extent server of one or more extent servers in a server group. The initiator 835 may transmit a leadership status request to the apparent leader extent server 840. The apparent leader extent server 840 may receive the leadership status request and determine whether it is the leader of the extent server group to which the apparent leader extent server 840 belongs. As previously discussed, in an extent server group including multiple extent servers 840, each of the extent servers 840 periodically or continuously communicate with each other to determine which extent server 840 is the leader extent server 840. Accordingly, leadership of the extent server group may change over time.

In some instances, the apparent leader extent server 840 to which the initiator 835 communicated the leadership status request determines that it is the leader extent server of the extent server group and, in other instances, determines that it is not the leader extent server of the extent server group. The apparent leader extent server 840 may generate a response indicating a leader status or a non-leader status in accordance with determining that it is a leader or a non-leader, respectively, of the extent server group. The apparent leader extent server 840 may transmit, to the NVD 830, the response indicating a leader status or the response indicating a non-leader status.

At block 1020, the method 1000 involves receiving, by the NVD 830, a response from the apparent leader extent server 840 indicating a leader status or a non-leader status. The NVD 830 may receive, from the apparent leader extent server 840, either the response indicating a leader status or the response indicating a non-leader status.

At block 1030, the method 1000 involves determining whether the received response indicates that the apparent leader extent server 840 is a leader extent server or a non-leader extent server. For example, the initiator 835 determines either that the received response indicates a leader status or that the received response indicates a non-leader status for the apparent leader extent server 840.

If the received response indicates that the identified leader extent server 840 is a non-leader extent server, the method 1000 proceeds to block 1040.

At block 1040, the method 1000 involves transmitting, by the NVD 830, a leader status request, as in block 1010, to a subsequent identified leader extent server 840 of the extent server group. For example, the initiator 835 accesses the list identifying an apparent leader extent server 840 for each extent server group. In certain embodiments, this list also identifies additional extent servers in each extent server group and the initiator 835 selects another extent server 840 in the extent server group other than the previously identified leader extent server 840. The initiator 835 receives a response from the other extent server 840 indicating a leader or a non-leader status. The initiator 835 may attempt communicating leader status requests to successive extent servers 840 of the extent server group until the initiator 835 receives a leader status response from the actual leader extent server 840 of the extent server group. For example, each time the initiator 835 receives a non-leader status response from the current identified leader extent server 840, the initiator 835 identifies, from the list, a subsequent identified leader extent server 840 to which to communicate the leader status request and communicates, as in block 1010, the leader status request to the subsequent identified leader extent server 840. The initiator 835, as in block 1020, then receives either a leader status response or a non-leader status response and then determines, as in block 1030, whether the received response indicates a leader status or a non-leader status. In this example, the initiator 835 may repeat blocks 1010, 1020, and 1030 for each subsequently identified leader extent server 840 of an extent server group until the initiator receives, at block 1030, a leader status response. In certain examples, the initiator 835, the storage distribution subsystem 834, or the leader monitoring application of the NVD 830 updates the list identifying an apparent leader extent server 840 for each extent server group so that the apparent leader extent server 840 corresponds to the extent server 840 from which the initiator 835 received the response indicating the leader status. In this example, after receiving, at block 1030 a leader status response, the method 1000 proceeds to block 1050.

In an example, an extent server group includes extent servers 840A, 840B, and 840C and the list identifying an apparent leader extent server 840 for each extent server group identifies extent server 840A as the apparent leader extent server 840 of the extent server group. In this example, however, the initiator 835 receives a response from extent server 840A indicating a non-leader status of extent server 840A. In this example, in response to determining that the response from extent server 840A indicates a non-leader status of extent server 840A, the initiator identifies extent server 840B from the list as the apparent leader extent server and transmits a leader status request to extent server 840B. In this example, the initiator 835 receives, from the extent server 840B, a response indicating a leader status.

In certain embodiments, a response indicating the non-leader status includes an identity of the leader extent server 840 of the extent server group and the initiator 835 transmits a leader status request to the identified leader extent server 840 corresponding to the response that indicated a non-leader status.

Returning to block 1030 of FIG. 10, if the received response indicates that the apparent leader extent server 840 is the leader extent server, the method 1000 proceeds to block 1050. For example, the initiator 835 determines that the received response indicates that the apparent leader extent server 840 is the leader extent server of the extent server group and, accordingly, identifies the apparent leader extent server 840 is the leader extent server 840.

At block 1050, the method 1000 involves transmitting, by the NVD 830, a data stripe to the identified leader extent server 840. For example, the initiator 835 transmits the data stripe along with a storage write request to the identified leader extent server 840. For example, the initiator 835 transmits the data stripe assigned to the server group to the identified leader extent server 840.

Figure 11:
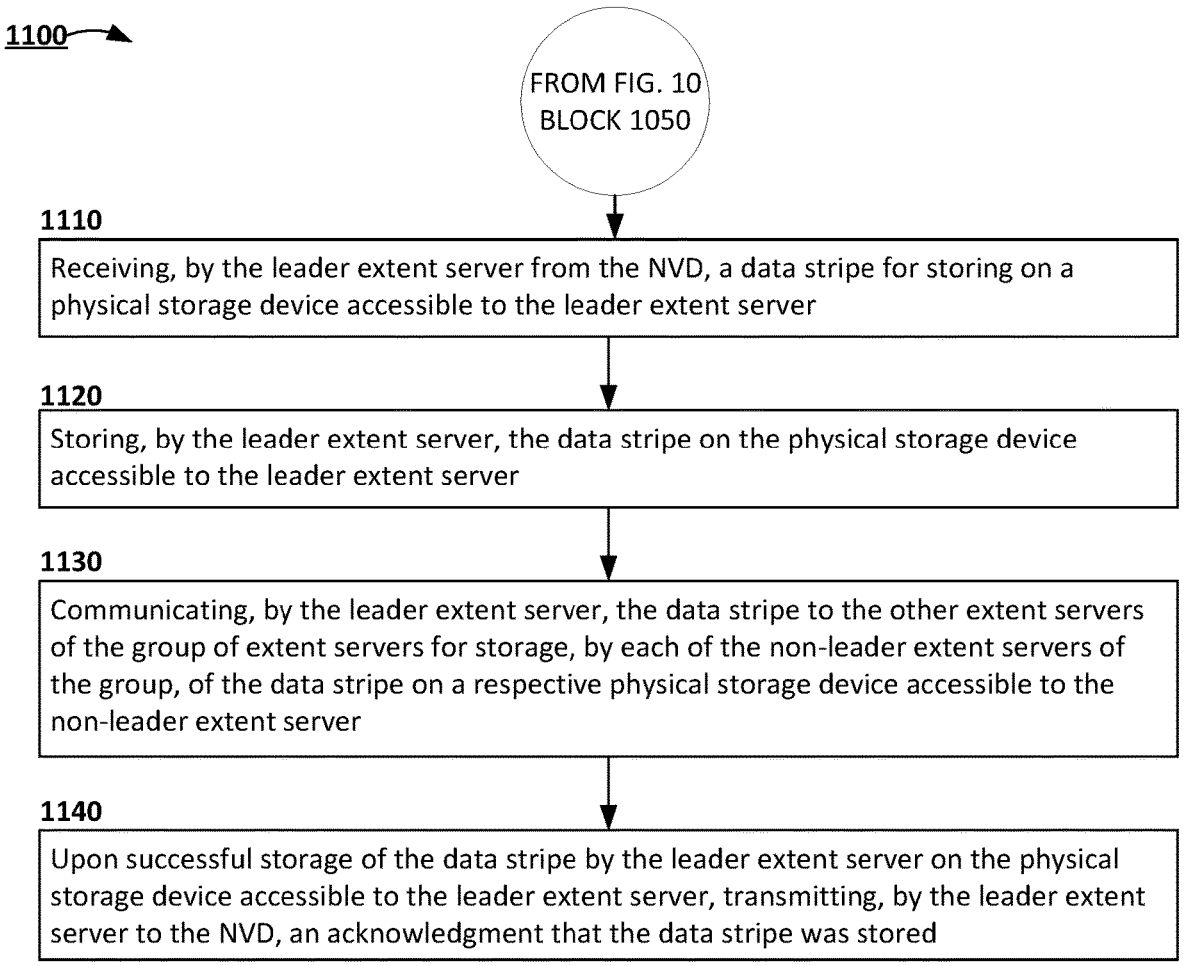
FIG. 11 depicts a method for storing, by a leader extent server, a data stripe received from an NVD and transmitting, by the leader extent server, an acknowledgment that the data stripe was stored, in accordance with certain embodiments.

At block 1060, the method 1000 involves the identified leader extent server 840 performing operations. For example, the identified leader extent server 840 receives the data stripe and the storage write request and performs operations to process the storage write request. FIG. 11 describes example operations performed by the identified leader extent server 840 after the NVD 830 transmits the data stripe to the identified leader extent server 840 in block 1050. In some instances, block 1110 is performed subsequent to block 1050 of FIG. 10.

FIG. 11 depicts an example of a method 1100 for storing, by a leader extent server 840, a data stripe received from an NVD 830 and transmitting, by the leader extent server 840, an acknowledgment that the data stripe was stored. For illustrative purposes, the method 1100 is described with reference to the components illustrated in FIG. 8, although other implementations are possible. For example, the program code for the extent server 840, which is stored in a non-transitory computer-readable medium, is executed by one or more processing devices to cause the extent server 840 to perform one or more operations described herein. In certain embodiments, the steps described in FIG. 11 are performed by each leader extent server 840 to which the NVD 830 transmits a data stripe associated with a storage write request.

At block 1110, the method 1100 involves receiving, by the leader extent server 840 from the NVD 830, a data stripe for storing on a physical storage device 841 accessible to the leader extent server 840. The leader extent server 840 may communicate with the initiator 835 of the NVD 830 to receive the data stripe and a request to store the data stripe. For example, the NVD 830 divided data for storage into multiple data stripes, including the data stripe, using a striping algorithm, assigned the data stripe to a group of extent servers 840 associated with the leader extent server 840, and transmitted the data stripe to the leader extent server 840. In some instances, the initiator 835 of the NVD 830 encrypted the data stipe prior to transmitting the data stripe to the leader extent server 840 and the leader extent server 840 receives an encrypted data stripe and stores the encrypted data stripe in the physical storage device 841. In some instances, the leader extent server 840 decrypts the data stripe using a key shared with the NVD 830.

At block 1120, the method 1100 involves storing, by the leader extent server 840, the data stripe on the physical storage device 841 accessible to the leader extent server 840. In some instances, the physical storage device 841 includes a local or remote data storage structure accessible to the leader extent server 840 suitable for storing information including the data stripe. The leader extent server 840 stores the data stripe on a block 842842 of the physical storage device 841. For example, a storage space of the physical storage device 841 includes multiple blocks, including the block 842 on which the data stripe is stored. The leader extent server 840 may log an identifier for the data stripe and for the block 842 in a storage log so that the leader extent server 840 can access the data stripe from the physical storage device 841 in response to receiving a request from the NVD 830.

At block 1130, the method 1100 involves communicating, by the leader extent server 840, the data stripe to the other extent servers 840 of the group of extent servers 840 for storage, by each of the non-leader extent servers 840 of the group, of the data stripe on a respective physical storage device 841 accessible to the non-leader extent server 840. Each of the non-leader extent servers 840 may receive the data stripe from the leader extent server 840 and store, in a block 842 of a physical storage device 841 accessible to the respective non-leader extent server 840, the data stripe. Each of the non-leader extent servers 840 may, upon successful storage of the data stripe on the respective physical storage device 841 accessible to the non-leader extent server 840, transmit a notification to the leader extent server 840 confirming that the data stripe was successfully stored on the respective physical storage device 841. The leader extent server 840 may receive, from each of the non-leader extent servers 840 of the group, the notification confirming that the data stripe was successfully stored.

In an example, the group of extent servers 840 includes extent servers 840A, 840B, and 840C, where extent server 840A is the leader extent server of the group and extent servers 840B and 840C are non-leader extent servers of the group. In this example, the leader extent server 840A transmits the data stripe to each of non-leader extent server 840B and non-leader extent server 840C along with a request to store the data stripe. In this example, the non-leader extent server 840B receives the data stripe from the leader extent server 840A, stores the data stripe in a block 842B of a physical storage device 841B accessible to the non-leader extent server 840B, and, upon successful storage of the data stripe on the physical storage device 841B, transmits a notification to the leader extent server 840A confirming that the data stripe was successfully stored. In this example, the non-leader extent server 840C receives the data stripe from the leader extent server 840A, stores the data stripe in a block 842C of a physical storage device 841C accessible to the non-leader extent server 840C, and, upon successful storage of the data stripe on the physical storage device 841C, transmits a notification to the leader extent server 840A confirming that the data stripe was successfully stored. In this example, the leader extent server 840A receives the notification confirming successful storage of the data stripe from each of the non-leader extent servers 840B and 840C.

At block 1140 the method 1100 involves transmitting, by the leader extent server 840 to the NVD 830 upon successful storage of the data stripe by the leader extent server 840 on the physical storage device 841 accessible to the leader extent server 840, an acknowledgment that the data stripe was stored. For example, the leader extent server 840 transmits, to the NVD 830, the acknowledgment that the data stripe was stored in response to receiving, from each of the non-leader extent servers 840 of the group of extent servers 840, the notification confirming that the data stripe was successfully stored.

FIG. 12 depicts an example of a method 1200 for transmitting, by a host machine 810, a data request to an NVD 830 and receiving, by the host machine 810 from the NVD 830, an acknowledgment of successful storage of the data on physical storage devices 841 accessible to extent servers 840 that communicate with the NVD 830. For illustrative purposes, the method 1200 is described with reference to the components illustrated in FIG. 8, although other implementations are possible. For example, the program code for the host machine 810, which is stored in a non-transitory computer-readable medium, is executed by one or more processing devices to cause the host machine 810 to perform one or more operations described herein.

At block 1210, the method 1200 involves generating, by the application 813 executing on a compute instance 811 on the host machine 810, a request to store data. In some instances, when the application 813 is requesting to store data, the file system 816 may receive a storage write request (e.g. an I/O request or other data request etc.) along with data for storage.

At block 1220, the method 1200 involves receiving, by the kernel 815 of the host machine 810 from the application 813 executing on the compute instance 811 on the host machine 810, data to be stored. The file system 816 may forward the storage write request to a block layer 817 of the kernel 815. In certain embodiments, the kernel 815 comprises a kernel space of the host machine 810 operating system 814. In other embodiments, the kernel 815 comprises a kernel space of the compute instance 811.

At block 1230, the method 1200 involves transmitting, by the kernel 815 of the host machine 810, using a storage driver 818 and through a root port 820, a request including the data to an NVD 830, wherein a storage handler subsystem 832 of the NVD 830 performs disk striping on the data and transmits one or more data stripes to one or more extent servers 840 for storage on physical storage devices 841. The block layer 817 of the kernel 815 may implement an interface used by the file system 816 to access storage devices, including the storage driver 818 (e.g. NVMe driver). The storage driver 818 may implement a communication specification (e.g. an NVMe specification) to communicate with solid state drive (SSDs), for example, PCIe-based SSDs, The storage driver 818 may transmit the data for storage (e.g. packets of data for storage) associated with the storage write request via the root port 820 (e.g. a PCIe root port) over the communication link 825 (e.g. a PCIe link) to the storage handler subsystem 832 of the NVD 830. The storage driver 818 may also receive packets from the storage handler subsystem 832 of the NVD 830 via the communication link 825 and the root port 822. Performing, by a storage handler subsystem 832 of the NVD 830, disk striping on the data and transmitting one or more data stripes to one or more extent servers 840 for storage on physical storage devices 841 may involve performing one or more steps described herein in FIG. 9, FIG. 10, and FIG. 11. For example, FIG. 9 describes striping, by an NVD 830, data received in a data write request from a compute instance 811 of a host machine 810 for storage on one or more extent servers 840. FIG. 10 describes identifying, by an NVD 830, a leader extent server 840 of a group of extent servers 840 and transmitting, by the NVD 830, a data stripe generated via the method described in FIG. 9 to the identified leader extent server. FIG. 11 describes a method for storing, by a leader extent server 840, a data stripe received from an NVD 830 and transmitting, by the leader extent server 840 to the NVD 830, an acknowledgment that the data stripe was stored.

At block 1240, the method 1200 involves receiving, by the kernel 815 of the host machine 810, using the storage driver 818 and through the root port 820, an acknowledgment from the storage handler subsystem 832 of the NVD 830 that the data was successfully stored on the physical storage devices 841 by the one or more extent servers 840. The NVD 830 may receive, from each of the extent servers 840 to which the NVD 830 transmitted a data stripe associated with a storage write request (e.g. a data stripe of multiple data stripes generated by applying a striping algorithm to data for storage included in the storage write request), an acknowledgment that the data stripe was stored on a physical storage device accessible to the respective extent server 840. The storage handler subsystem 832 of the NVD 830 may, in response to receiving, from each of the extent servers 840, an acknowledgement that a respective data stripe was stored on a respective physical storage device 841 accessible to the extent server 840, transmit an acknowledgment to the host machine 810 that the data was successfully stored on the physical storage devices 841 of by the one or more extent servers 840. Particularly, the storage handler subsystem 832 may transmit the acknowledgment to the application 813 executing on compute instance 811 of the host machine 810 from which the storage write request originated by communicating the acknowledgment to the kernel 815 through the root port 820. The application 813 may receive or otherwise access the acknowledgment via the kernel 815.

Example Infrastructure as a Service (Iaas) Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
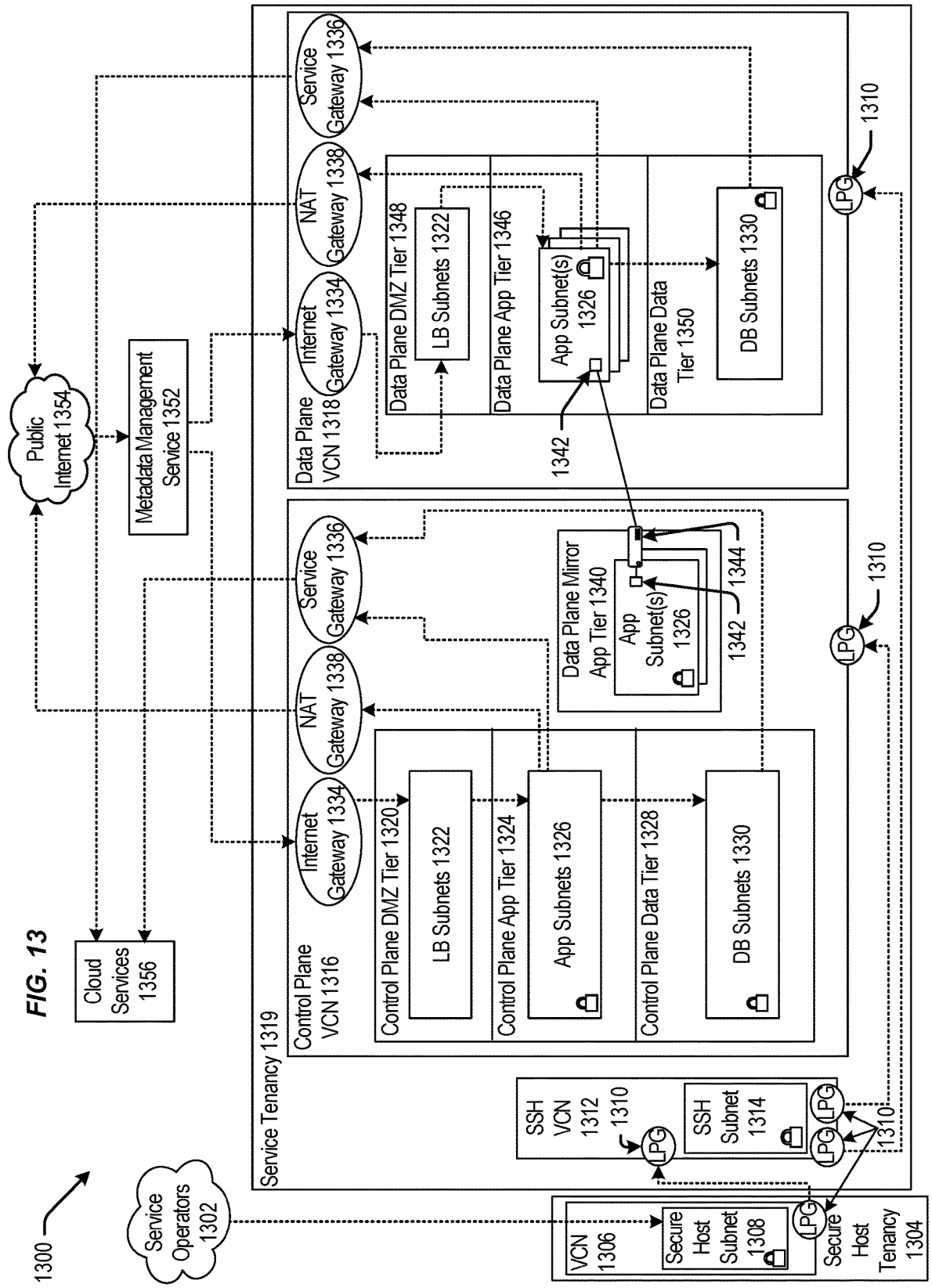
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
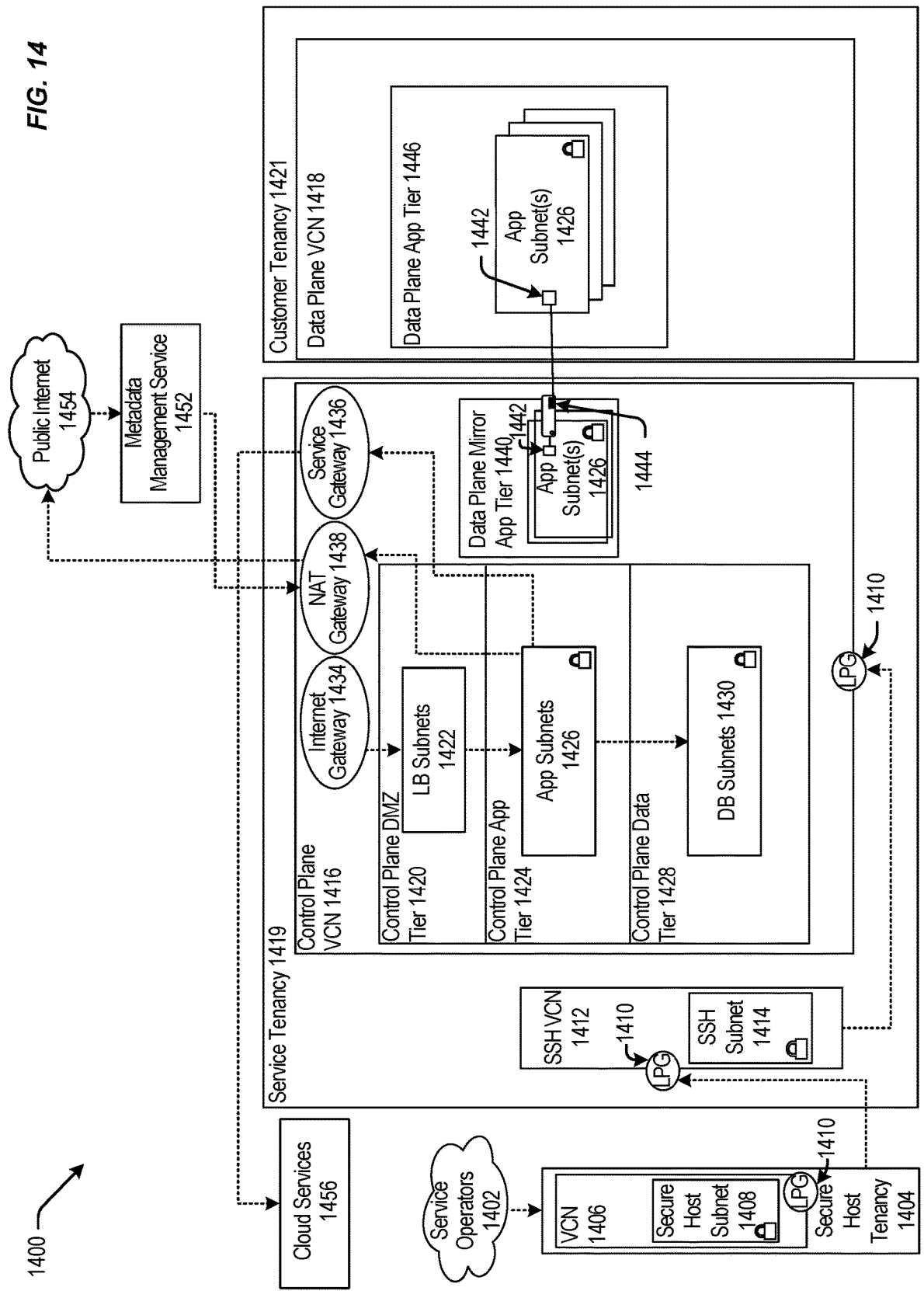
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 141412 (e.g. the SSH VCN 1312 of FIG. 13) via an LPG 1310 contained in the SSH VCN 141412. The SSH VCN 141412 can include an SSH subnet 1414 (e.g. the SSH subnet 1314 of FIG. 13), and the SSH VCN 141412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 13421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 13421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 13421. The compute instance 1444 may allow resources, that are provisioned in the control plane VCN 1416 that is contained in the service tenancy 1419, to be deployed or otherwise used in the data plane VCN 1418 that is contained in the customer tenancy 13421.

In other examples, the customer of the IaaS provider may have databases that live in the customer tenancy 13421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 13421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 13421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 11," may be located in Region 1 and in "Region 2." If a call to Deployment 11 is made by the service gateway 1436 contained in the control plane VCN 1416 located in Region 1, the call may be transmitted to Deployment 11 in Region 1. In this example, the control plane VCN 1416, or Deployment 11 in Region 1, may not be communicatively coupled to, or otherwise in communication with, Deployment 11 in Region 2.

Figure 15:
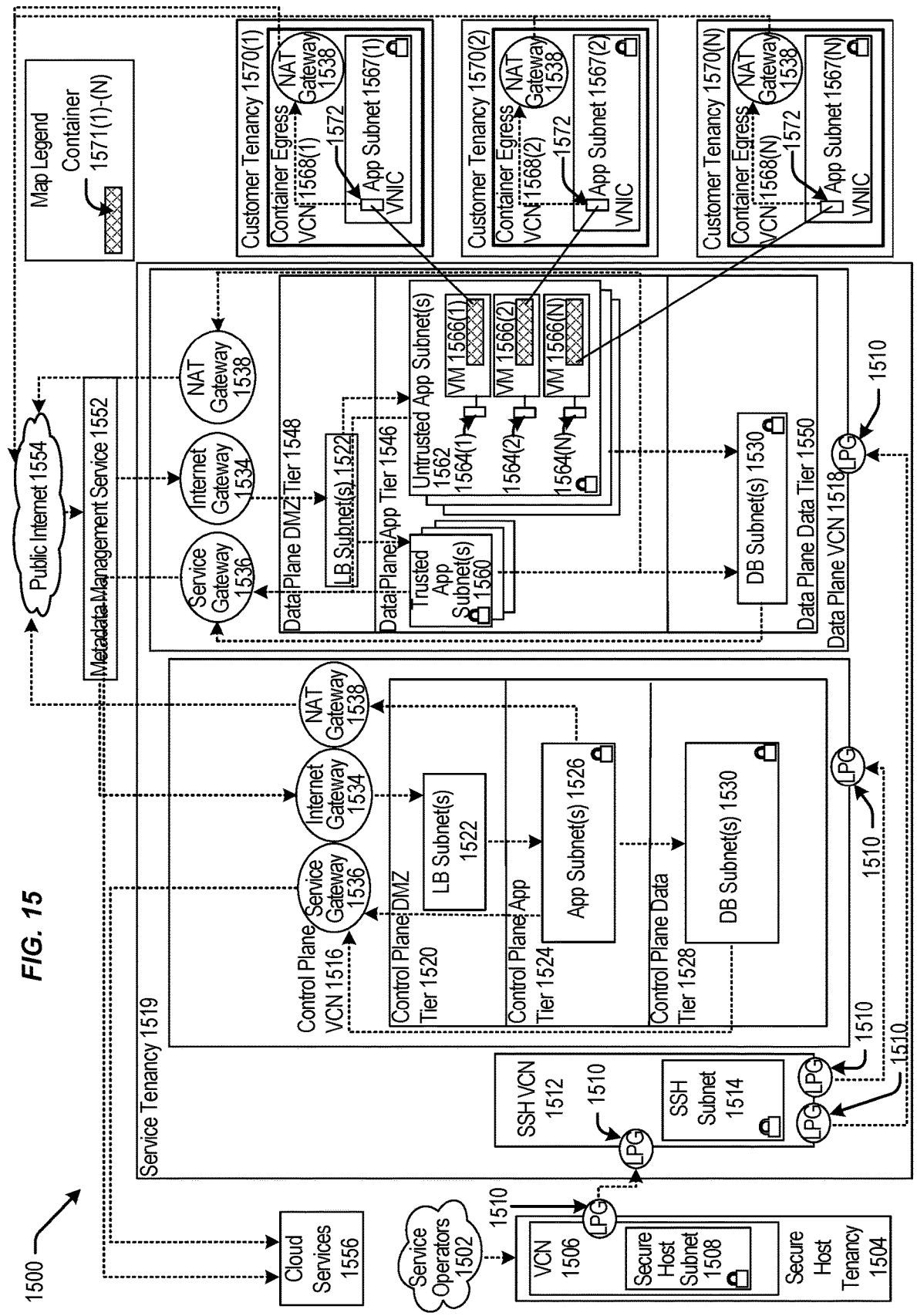
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
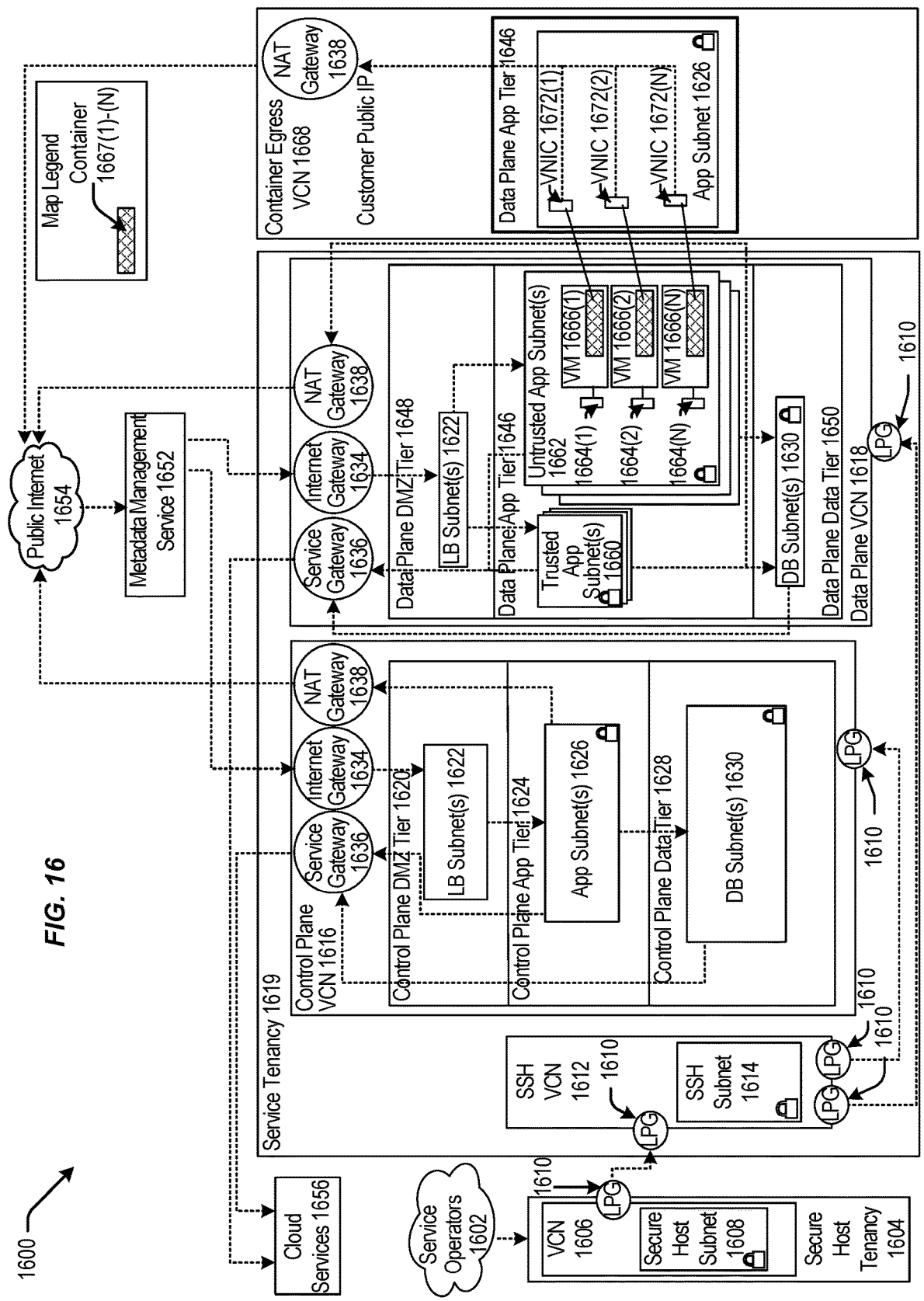
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 141612 (e.g. the SSH VCN 1312 of FIG. 13) via an LPG 1610 contained in the SSH VCN 141612. The SSH VCN 141612 can include an SSH subnet 161614 (e.g. the SSH subnet 1314 of FIG. 13), and the SSH VCN 141612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
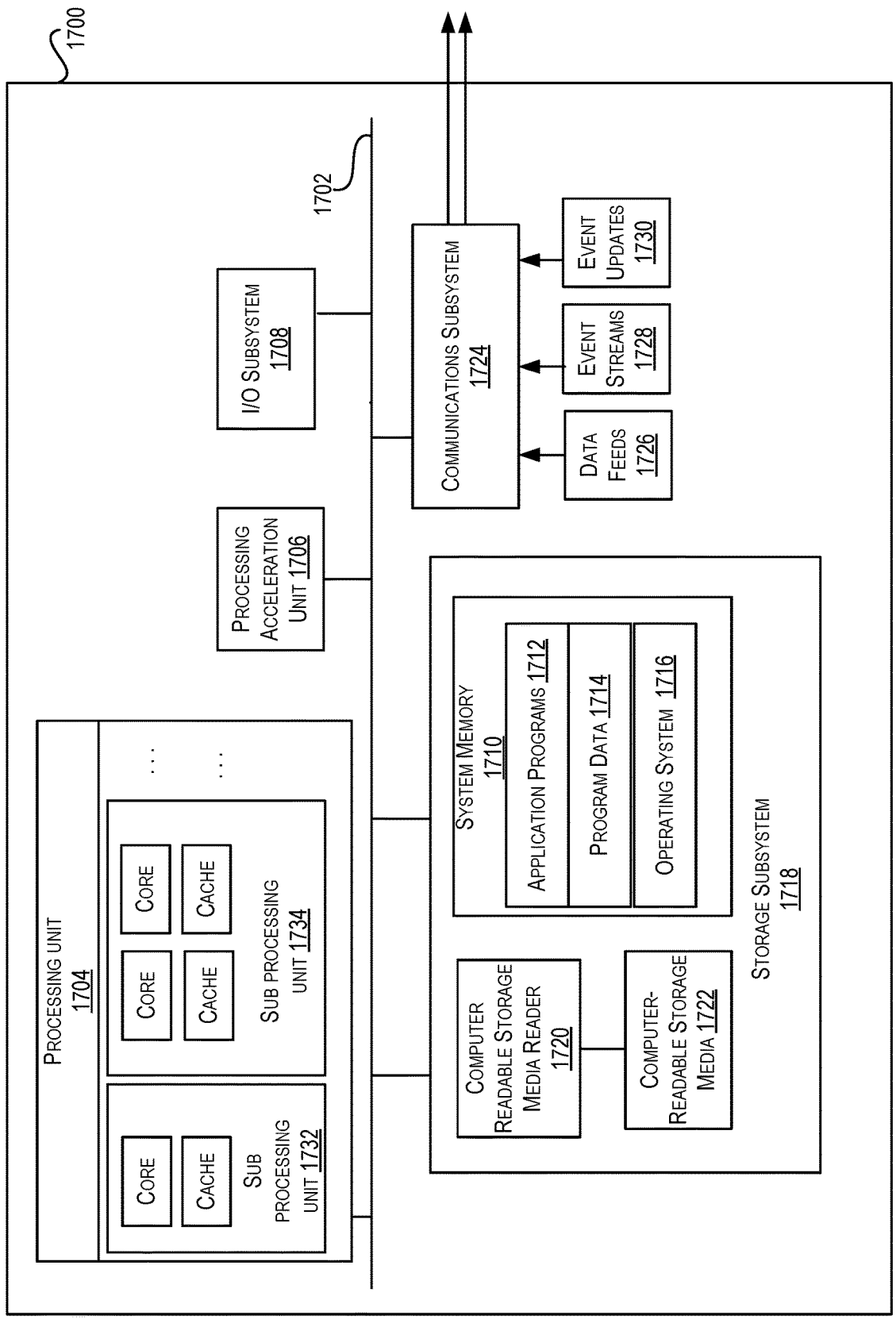
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., PCIe) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method comprising:
responsive to receiving a storage request at a network virtualization device, wherein the storage request originates from a compute instance executed by a host machine separate from the network virtualization device, and wherein the storage request comprises data to be stored, performing by the network virtualization device:
  dividing the data to be stored into a set of one or more data stripes;
  for a first data stripe in the set of data stripes, performing by the network virtualization device:
    determining, from a plurality of extent servers, a first extent server to which the first data stripe is to be sent for storing the first data stripe;
    transmitting the first data stripe to the first extent server, wherein the first extent server stores the first data stripe to a first physical storage device; and
    receiving, from the first extent server, an acknowledgement confirming that the first data stripe was stored.

2. The method of claim 1, further comprising, in response to receiving the acknowledgement, for each of the one or more data stripes of the one or more data stripes other than the first data stripe, confirming that each data stripe was stored by a respective extent server, transmitting, by the network virtualization device and to the compute instance, the confirmation that each data stripe was successfully stored.

3. The method of claim 1, wherein the first extent server stores the first data stripe in the first physical storage device that is accessible to the first extent server, wherein the first extent server sends the acknowledgement in response to storing the first data stripe on the first physical storage device.

4. The method of claim 3, wherein a group of servers comprises the first extent server and one or more other extent servers, wherein the first extent server transmits the first data stripe to the one or more other extent servers of the group of servers for storage by the one or more other extent servers.

5. The method of claim 1, further comprising, for a second data stripe in the set of data stripes, by the network virtualization device:
  determining, from the plurality of extent servers, a second extent server to which the second data stripe is to be sent for storing the second data strip, wherein the second extent server is different from the first extent server;
  transmitting the second data stripe to the second extent server, wherein the second extent server stores the second data stripe to a second physical storage device, wherein the second physical storage device is different from the first physical storage device; and
  receiving, from the second extent server, an acknowledgement confirming that the second data stripe was stored.

6. The method of claim 5, further comprising identifying, by the network virtualization device and among one or more identified extent servers, a primary candidate leader server and a secondary candidate leader server, wherein the secondary candidate leader server comprises the first extent server, wherein the primary candidate leader server comprises a third extent server and further comprising, by the network virtualization device at a time prior to transmitting the first data stripe to the first extent server:
  transmitting, to the third extent server, the first data stripe; and
  receiving, from the third extent server, a notification that the third extent server is not a leader, wherein the first data stripe is transmitted to the first extent server in response to receiving the notification.

7. The method of claim 1, wherein generating the one or more data stripes comprises applying a redundant array of independent disks striping algorithm ("RAID0 algorithm") to divide the data to be stored into the set of data stripes.

8. The method of claim 1, wherein the storage request is a non-volatile memory express ("NVMe") protocol request.

9. A system, comprising:
  a network virtualization device comprising:
    one or more processors; and
    a non-transitory computer-readable storage medium comprising computer-executable instructions that, when executed by the one or more processors, cause the system to:
      responsive to receiving a storage request comprising data to be stored, the storage request originating from a compute instance executed by a host machine separate from the network virtualization device, dividing the data to be stored into a set of one or more data stripes;
      for a first data stripe in the set of data stripes, determining, from a plurality of extent servers, a first extent server to which the first data stripe is to be sent for storing the first data stripe;
      transmitting the first data stripe to the first extent server, wherein the first extent server stores the first data stripe to a first physical storage device; and
      receiving, from the first extent server, an acknowledgement confirming that the first data stripe was stored.

10. The system of claim 9, wherein the non-transitory computer-readable medium further comprises instructions that, when executed by the one or more processors, cause the system to transmit to the compute instance, in response to receiving the acknowledgement, for each of the one or more data stripes of the one or more data stripes other than the first data stripe, confirming that each data stripe was stored by a respective extent server, the confirmation that each data stripe was successfully stored.

11. The system of claim 9, wherein the first extent server stores the first data stripe in the first physical storage device that is accessible to the first extent server, wherein the first extent server sends the acknowledgement in response to storing the first data stripe on the first physical storage device.

12. The system of claim 11, wherein a group of servers comprises the first extent server and one or more other extent servers, wherein the first extent server transmits the first data stripe to the one or more other extent servers of the group of servers for storage by the one or more other extent servers.

13. The system of claim 9, the non-transitory computer-readable medium further comprising instructions that, when executed by the one or more processors, cause the system to:
  for a second data stripe in the set of data stripes:
    determine, from the plurality of extent servers, a second extent server to which the second data stripe is to be sent for storing the second data strip, wherein the second extent server is different from the first extent server;
    transmit the second data stripe to the second extent server, wherein the second extent server stores the second data stripe to a second physical storage device, wherein the second physical storage device is different from the first physical storage device; and receive, from the second extent server, an acknowledgement confirming that the second data stripe was stored.

14. The system of claim 13, the non-transitory computer-readable medium further comprising instructions that, when executed by the one or more processors, cause the system to:
further comprising identify, by the network virtualization device and among one or more identified extent servers, a primary candidate leader server and a secondary candidate leader server;
wherein the secondary candidate leader server comprises the first extent server;
wherein the primary candidate leader server comprises a third extent server; and
wherein the non-transitory computer-readable medium further comprises instructions that, when executed by the one or more processors, cause the system to:
at a time prior to transmitting the first data stripe to the first extent server, transmitting, to the third extent server, the first data stripe; and
receiving, from the third extent server, a notification that the third extent server is not a leader, wherein the first data stripe is transmitted to the first extent server in response to receiving the notification.

15. The system of claim 9, wherein generating the one or more data stripes comprises applying a redundant array of independent disks striping algorithm ("RAID0 algorithm") to divide the data to be stored into the set of data stripes.

16. A non-transitory computer-readable storage medium comprising computer-executable instructions that when executed by a processor of a network virtualization device, cause the processor to:
receive a storage request, wherein the storage request originates from a compute instance executed by a host machine separate from the network virtualization device, and wherein the storage request comprises data to be stored;
divide the data to be stored into a set of one or more data stripes;
for a first data stripe in the set of data stripes:
determine, from a plurality of extent servers, a first extent server to which the first data stripe is to be sent for storing the first data stripe;
transmit the first data stripe to the first extent server, wherein the first extent server stores the first data stripe to a first physical storage device; and
receive, from the first extent server, an acknowledgement confirming that the first data stripe was stored.

17. The non-transitory computer-readable storage medium of claim 16, further comprising computer executable instructions that when executed by the processor further cause the processor to:
confirm, in response to receiving an acknowledgement for each of the one or more data stripes, that each of the one or more data stripes was stored by a respective extent server; and
transmit, to the compute instance, the confirmation that each of the one or more data stripes was successfully stored.

18. The non-transitory computer-readable storage medium of claim 16, wherein the first extent server stores the first data stripe in the first physical storage device accessible to the first extent server, wherein the first extent server sends the acknowledgement in response to storing the first data stripe on the first physical storage device.

19. The non-transitory computer-readable storage medium of claim 18, wherein a group of servers comprises the first extent server and one or more other extent servers, wherein the first extent server transmits the first data stripe to the one or more other extent servers of the group of servers for storage by the one or more other extent servers.

20. The non-transitory computer-readable storage medium of claim 16, further comprising computer-executable instructions that when executed by the processor further cause the processor to:
for a second data stripe in the set of data stripes:
determine, from the plurality of extent servers, a second extent server to which the second data stripe is to be sent for storing the second data strip, wherein the second extent server is different from the first extent server;
transmit the second data stripe to the second extent server, wherein the second extent server stores the second data stripe to a second physical storage device, wherein the second physical storage device is different from the first physical storage device; and
receive, from the second extent server, an acknowledgement confirming that the second data stripe was stored.

* * * * *